US012497182B2

(12) United States Patent
Lu et al.

(10) Patent No.: US 12,497,182 B2
(45) Date of Patent: Dec. 16, 2025

(54) METHODS AND APPARATUS FOR GENERATING USAGE SEVERITY INDICES

(71) Applicant: The Boeing Company, Arlington, VA (US)

(72) Inventors: Yi Lu, Media, PA (US); Jesse K. Senyo, Wallingford, PA (US); Chandrakant Patel, Deptford, NJ (US); Michael D. Malason, Mickleton, NJ (US)

(73) Assignee: The Boeing Company, Arlington, VA (US)

( * ) Notice: Subject to any disclaimer, the term of this patent is extended or adjusted under 35 U.S.C. 154(b) by 251 days.

(21) Appl. No.: 18/303,297

(22) Filed: Apr. 19, 2023

(65) Prior Publication Data

US 2024/0351698 A1  Oct. 24, 2024

(51) Int. Cl.
*B64D 31/00* (2024.01)
*B64D 31/08* (2006.01)
*B64D 35/04* (2006.01)
*G08G 5/30* (2025.01)

(52) U.S. Cl.
CPC ............. *B64D 31/08* (2013.01); *B64D 35/04* (2013.01); *G08G 5/30* (2025.01)

(58) Field of Classification Search
CPC ................... B64D 31/08; B64D 35/04; B64D 2045/0085; B64D 45/00; B64D 31/00; G08G 5/30; G05B 2219/45071; G05B 23/0283; B64F 5/60; B64C 27/08; B64U 10/17
USPC ............................................................ 701/3
See application file for complete search history.

(56) References Cited

U.S. PATENT DOCUMENTS

| 2015/0007666 A1* | 1/2015 | Tucker | ................... G06F 30/15 703/8 |
| 2018/0170532 A1* | 6/2018 | Black | ..................... B64D 45/00 |
| 2018/0257765 A1* | 9/2018 | Derham | ............... G05D 1/0066 |

(Continued)

FOREIGN PATENT DOCUMENTS

EP          2821873 A2     1/2015

OTHER PUBLICATIONS

European Patent Office, "Extended European Search Report," issued in connection with European Patent Application No. 24158303.8, dated Jul. 22, 2024, 10 pages.

(Continued)

*Primary Examiner* — Shardul D Patel
(74) *Attorney, Agent, or Firm* — Hanley, Flight & Zimmerman, LLC

(57) ABSTRACT

Methods and apparatus for generating usage severity indices are disclosed herein. An example apparatus includes interface circuitry, machine readable instructions, and programmable circuitry to at least one of instantiate or execute the machine readable instructions to determine a first usage severity index for a drive system of an aircraft based on engine torque data, determine a second usage severity index for a rotor system of the aircraft based on cruise guide indicator data, determine a third usage severity index for a pylon structure of the aircraft based on flight regime data, and generate a flight-based usage severity index for the aircraft using the first usage severity index, the second usage severity index, and the third usage severity index.

20 Claims, 15 Drawing Sheets

(56) References Cited

U.S. PATENT DOCUMENTS

2021/0067923 A1\* 3/2021 Stein .................. H04L 67/12

OTHER PUBLICATIONS

Oldersma et al., "Airframe loads & usage monitoring of the CH-47D 'Chinook' helicopter of the Royal Netherlands Air Force," National Aerospace Laboratory NLR, dated Jun. 3, 2011, retrieved from http://www.nlr.nl/?id=17188&1=en, 33 pages.

\* cited by examiner

METHODS AND APPARATUS FOR GENERATING USAGE SEVERITY INDICES

GOVERNMENT LICENSE RIGHTS

This invention was made with government support under CHC/087-378 awarded by United States Department of Defense. The government has certain rights in the invention.

FIELD OF THE DISCLOSURE

This patent relates generally to a data tracking system and, more particularly, to data tracking focused on usage severity indices.

BACKGROUND

Tracking aircraft usage severity data can be used for assessing aircraft optimum retirement lives assigned to flight critical dynamic components and/or airframe components. In particular, tracking aircraft usage severity data can be used for timely maintenance to avoid in-service failures.

SUMMARY

An example apparatus includes interface circuitry, machine readable instructions, and programmable circuitry to at least one of instantiate or execute the machine readable instructions to determine a first usage severity index for a drive system of an aircraft based on engine torque data and determine a second usage severity index for a rotor system of the aircraft based on cruise guide indicator data. The example apparatus also includes machine readable instructions to determine a third usage severity index for a pylon structure of the aircraft based on flight regime data and generate a flight-based usage severity index for the aircraft using the first usage severity index, the second usage severity index, and the third usage severity index.

An example method includes determining a first usage severity index for a drive system of an aircraft based on engine torque data and determining a second usage severity index for forward and aft rotor systems of the aircraft based on cruise guide indicator data. The example method also includes determining a third usage severity index for a pylon structure of the aircraft based on flight regime data and generating a flight-based usage severity index for the aircraft using the first usage severity index, the second usage severity index, and the third usage severity index.

An example non-transitory machine readable storage medium includes instructions to cause programmable circuitry to at least determine a first usage severity index for a drive system of an aircraft based on engine torque data, determine a second usage severity index for a rotor system of the aircraft based on cruise guide indicator data, determine a third usage severity index for a pylon structure of the aircraft based on flight regime data, and generate a flight-based usage severity index for the aircraft using the first usage severity index, the second usage severity index, and the third usage severity index.

Figure 1:
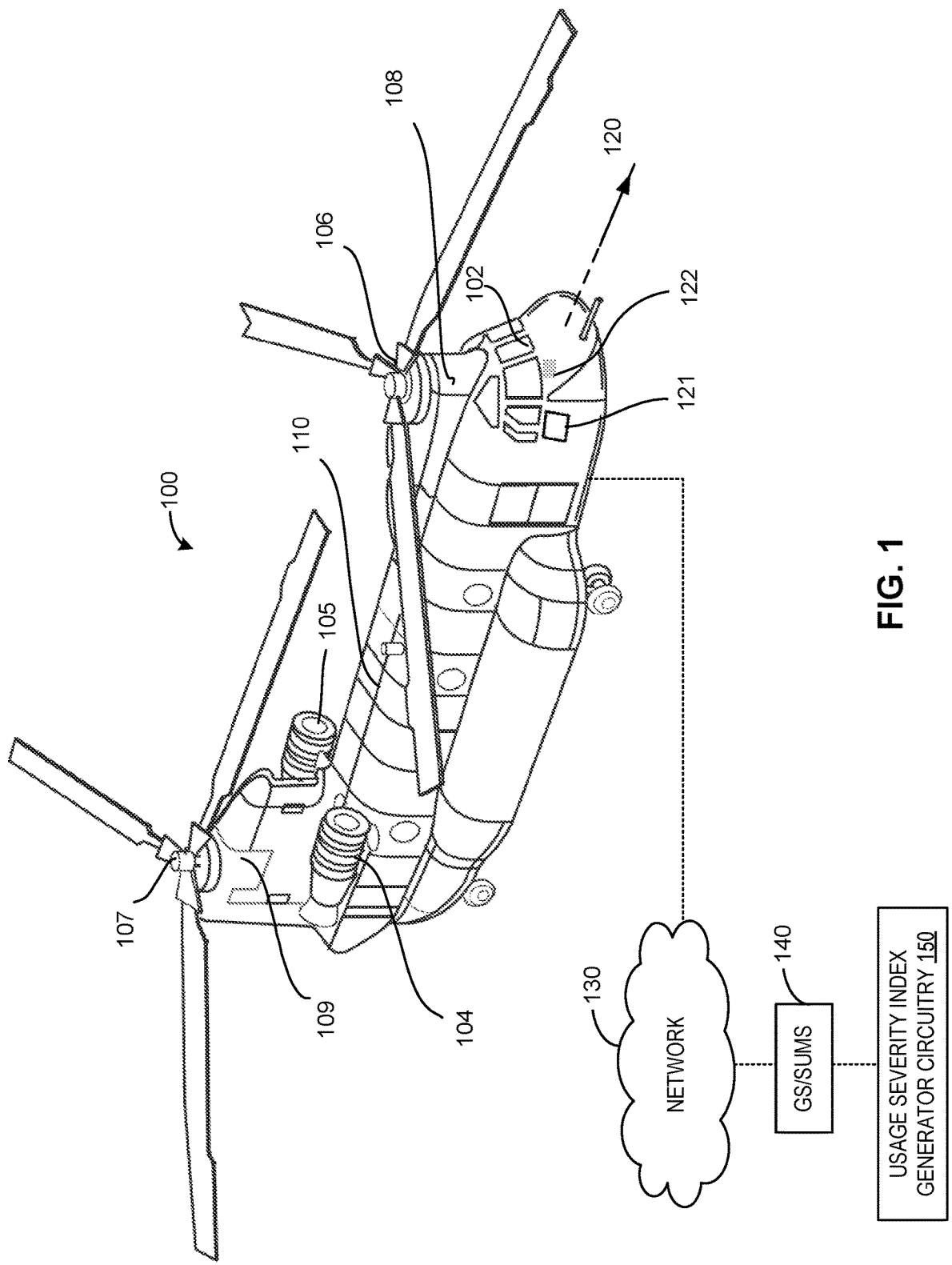
FIG. 1 illustrates an example tandem helicopter in which the examples disclosed herein can be implemented.

In general, the same reference numbers will be used throughout the drawing(s) and accompanying written description to refer to the same or like parts. The figures are not to scale. Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Aircraft fleets can be monitored to evaluate the overall safety of a fleet in terms of usage and reliability. In some examples, aircraft such as helicopters can be monitored to determine the severity of a particular flight on system components. Such monitoring over time allows for tracking of an aircraft's estimated service life based on the duration of aircraft usage and/or the severity of aircraft usage. For example, aircraft such as helicopters can engage in rapidly changing flight regimes throughout the course of a single flight (e.g., climbing, descending, acceleration, deceleration, performing a bank turn, etc.). In some examples, helicopters are equipped with a Health and Usage Monitoring System (HUMS) for automatically monitoring aircraft signals through a network of sensors and/or onboard computers. The sensors can be distributed throughout the airframe and airframe components, with the sensors linked to a central computer unit with a data recording and storage system. For example, HUMS or flight data recorder (FDR) data can capture flight data and parameters associated with take-offs, landings, engine starts, etc. In some examples, the data capture also includes monitoring of vibrating and spinning components of the aircraft (e.g., engines, gearboxes, shafts, fans, rotor systems, etc.). A usage monitoring system such as a Structural Usage Monitoring System (SUMS) can be used to analyze flight data from any digital source collector (DSC) (e.g., such as a HUMS or FDR) for post data processing and calculation, as well as flight regime recognition in tracking overall actual usage or health of an aircraft and fleet. For example, HUMS records the status of critical systems and components on helicopters to permit early detection of progressive defects. In some examples, the data is captured via satellite communications while the helicopter is still in flight, allowing maintenance control units to schedule and perform condition-based maintenance on the helicopter after landing. The retrieved information and data characteristics can be employed in performing condition-based maintenance (CBM), assessing fatigue damage of critical life-limited dynamic components, and enhancing the usage spectrum and/or live documents. However, given the vast amount of data generated by HUMS or FDR, the size of the data can be difficult to postprocess, inhibiting efficient data mining that can be used to obtain a high degree of accuracy and usefulness.

Methods and apparatus disclosed herein generate usage severity indices that can be used to quantify, rank, and trend the usage severity of each flight, aircraft, and/or an entire fleet. For example, key state parameters readily available in an aircraft's flight data recorder (FDR) can be used to assign a severity index to each flight. Methods and apparatus disclosed herein can use actual usage data from any advanced digital data source collector that provides the benefit of conditional based maintenance. In examples disclosed herein, usage severity indices can be assigned for flight critical, fatigue life-limited dynamic components (e.g., drive system and rotor system) and/or airframe (aft pylon) structures based on actual usage data from recorded state parameters (e.g., from a helicopter's FDR). Methods and apparatus disclosed herein introduce continuous usage severity monitoring, reducing costs associated with traditional operating flight test programs that require deploying fully instrumented aircraft to measure loads and/or monitor the usage of an individual aircraft.

In examples disclosed herein, generated usage severity indices can be used for tracking an aircraft's usage severity over time to validate usage assumptions. Validation of usage assumptions ensures that the assumptions are sufficiently conservative such that the retirement lives assigned to flight critical dynamic and airframe components are sufficient to avoid in-service failures. As such, the severity indices improve helicopter reliability and aircraft safety by allowing for the continuous monitoring of actual aircraft usage. In particular, methods and apparatus disclosed herein define and develop the usage severity indices based on usage known to increase fatigue damage accumulation to aircraft components and structures. As such, the usage severity index provides a quantitative metric of usage severity including a rating system of −1 or 0 to 4 (e.g., 4 being the most severe) and can be assigned on a per flight basis. In examples disclosed herein, the usage severity index is designed as a feedback loop to allow flights with severe usage to be automatically identified and monitored over time to check and/or validate design usage spectrum assumptions.

Turning to the figures, FIG. 1 illustrates an example aircraft 100 in which the examples disclosed herein can be implemented. The aircraft 100 may be a manned aircraft (e.g., controlled via one or more pilots in the aircraft 100) or an unmanned aerial vehicle (UAV). In the illustrated example, the aircraft 100 is a tandem helicopter. In the illustrated example, the aircraft 100 includes a cockpit 102, a first engine 104, a second engine 105, a forward rotor 106, an aft rotor 107, a forward pylon 108, an aft pylon 109, and an engine drive system 110. A longitudinal axis 120 of the aircraft 100 is labeled in FIG. 1. The aircraft 100 can perform various flight maneuvers, including taking off and landing, vertical and level flights, accelerations, turns, sideslips, auto-rotations, pullups and pushovers, etc. These maneuvers are further classified as flight regimes, such as taxiing at various speeds and turn conditions, forward flying at various speeds and altitudes, turning at various airspeeds and bank angles, pullups or pushovers of various airspeeds and load factors, nap-of-earth flights of various aircraft configurations, etc.

While in the example of FIG. 1 the aircraft 100 is a helicopter with a tandem rotor configuration (e.g., two main rotor systems and no tail rotor), the aircraft 100 can include a helicopter with a main rotor and a tail rotor. As such, any type of size, rotor configuration, and/or number of engines can be associated with the aircraft 100, not limited to the example illustration shown in FIG. 1. In some examples, the aircraft 100 includes a Digital Source Collector (DSC) 121 (e.g., such as a FDR or HUMS) and a cruise guide indicator (CGI) 122 In the example of FIG. 1, the DSC 121 records the flight state parameters and engine data several times per second to preserve the recent history of the aircraft flight (e.g., parameters associated with aircraft flight attitude angles, speed, altitude, engine power, configuration, operation, etc.).

In the example of FIG. 1, the aircraft 100 is in communication with usage severity index generator circuitry 150 via a network 130. The usage severity index generator circuitry 150 can be a part of a ground station (GS) computer or structural usage monitoring system (SUMS) 140. Network 130 can be implemented using any suitable wired and/or wireless network(s) including, for example, one or more data buses, one or more Local Area Networks (LANs), one or more wireless LANs, one or more cellular networks, the Internet, etc. For example, the usage severity index generator circuitry 150 generates severity indices for the aircraft 100 drive system, rotor system (e.g., forward rotor system, aft rotor system), and/or aft pylon, as described in more detail in connection with FIG. 2.

Figure 2:
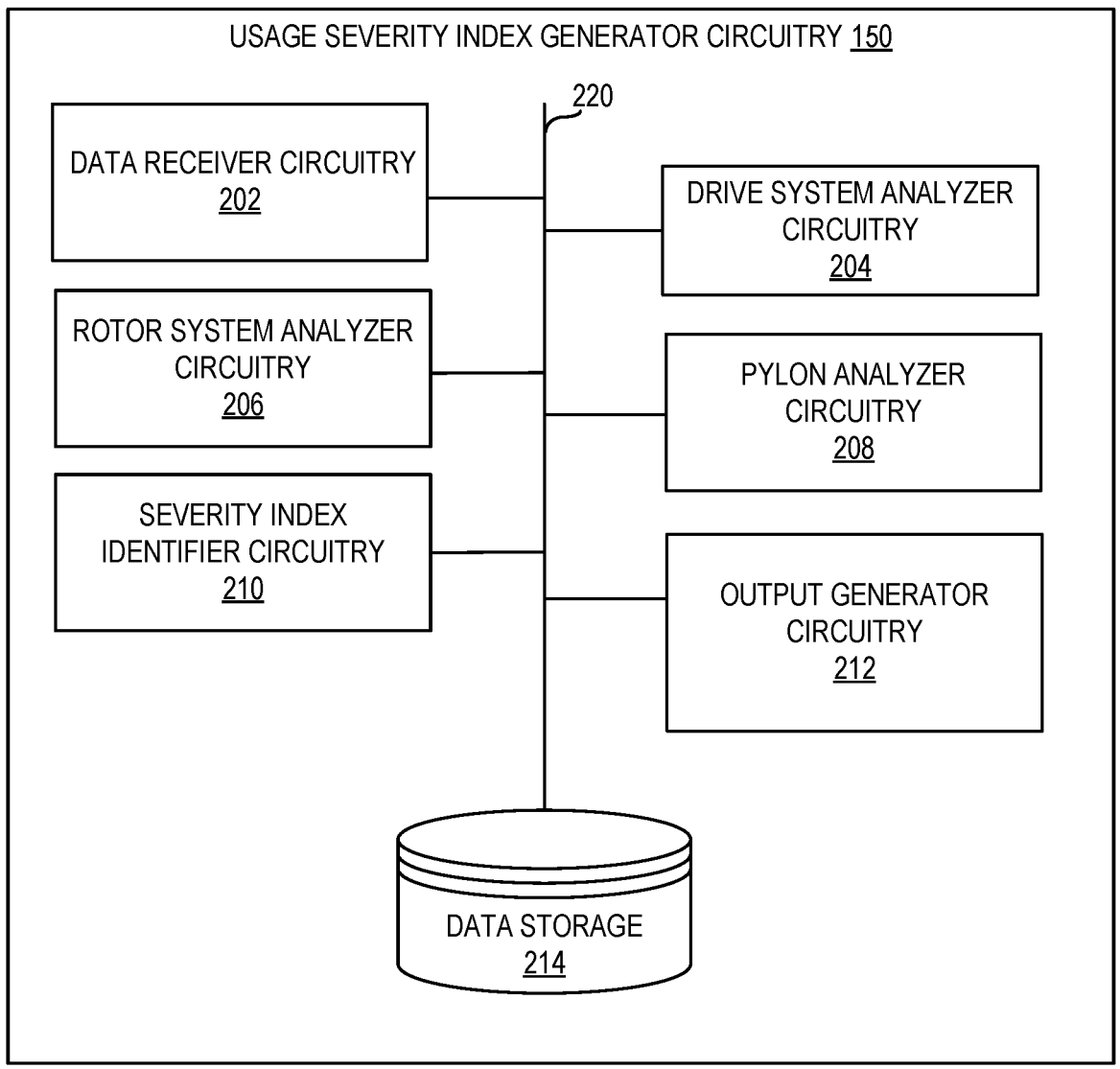
FIG. 2 is a block diagram representative of example usage severity index generator circuitry that may be implemented in accordance with teachings disclosed herein.

FIG. 2 is a block diagram 200 of an example implementation of the usage severity index generator circuitry 150 of FIG. 1. The usage severity index generator circuitry 150 of FIG. 1 may be instantiated (e.g., creating an instance of, bring into being for any length of time, materialize, implement, etc.) by processor circuitry such as a central processing unit executing instructions. Additionally or alternatively, the usage severity index generator circuitry 150 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example, the usage severity index generator circuitry 150 includes data receiver circuitry 202, drive system analyzer circuitry 204, rotor system analyzer circuitry 206, pylon analyzer circuitry 208, severity index identifier circuitry 210, output generator circuitry 212, and a data storage 214. In some examples, the data storage 214 is external to the usage severity index generator circuitry 150 in a location accessible to the usage severity index generator circuitry 150. In the example of FIG. 2, the data receiver circuitry 202, drive system analyzer circuitry 204, rotor system analyzer circuitry 206, pylon analyzer circuitry 208, severity index identifier circuitry 210, output generator circuitry 212, and/or the data storage 214 are in communication using an example bus 220.

The data receiver circuitry 202 receives flight data and/or usage severity index criteria for use in generating usage severity indices (USI). For example, the data receiver circuitry 202 receives flight-based information from the DSC 121 and/or any other type of onboard data collection system. The data receiver circuitry 202 can receive data such as state parameters, flight regimes, and flight conditions associated with the aircraft 100. In some examples, the data receiver circuitry 202 receives usage severity index criteria (e.g., drive system usage severity criteria, rotor system usage severity criteria, aft pylon usage severity criteria, etc.). For example, the usage severity criteria indicate the criteria used to assess the severity of a given flight to generate the usage severity index for each system of the aircraft 100 (e.g., drive system, rotor system, aft pylon, etc.), as described in more detail in connection with FIGS. 4, 5, and 6. The data receiver circuitry 202 also receives cruise guide indicator (CGI), actual usage spectrum (AUS), and design usage spectrum (DUS) damage rates (e.g., for a forward rotor, aft rotor, etc.) and/or AUS and DUS flight regime damage rates (e.g., damage rates associated with a climb, descent, bank turn, acceleration, etc.).

The drive system analyzer circuitry 204 determines a drive system usage severity index (DSUSI) for the aircraft 100 (e.g., a first usage severity index). For example, the drive system analyzer circuitry 204 determines the DSUSI based on engine torque data (TQ), flight conditions, and the usage severity criteria obtained using the data receiver circuitry 202. In some examples, the drive system analyzer circuitry 204 performs rain flow cycle counting (RFCC) to identify TQ cyclic indices. Based on the flight of the aircraft 100 (e.g., ground run flight, airborne flight) and the duration of the flight (e.g., less than half an hour), the drive system analyzer circuitry 204 identifies the DSUSI in accordance with the drive system usage severity criteria, as described in more detail in connection with FIG. 4.

The rotor system analyzer circuitry 206 determines a rotor system usage severity index (RSUSI) for the aircraft 100 (e.g., a second usage severity index). For example, the rotor system analyzer circuitry 206 determines the RSUSI based on cruise guide indicator (CGI) signal input, fatigue damage rates, the design usage spectrum (DUS), flight conditions, and/or the rotor system usage severity criteria obtained using the data receiver circuitry 202. Based on the flight of the aircraft 100 (e.g., ground run flight, airborne flight) and the duration of the flight (e.g., less than half an hour), the rotor system analyzer circuitry 206 identifies the RSUSI in accordance with the rotor system usage severity criteria, as described in more detail in connection with FIG. 5.

The pylon analyzer circuitry 208 determines an aft pylon usage severity index (APUSI) for the aircraft 100 (e.g., a third usage severity index). For example, the aft pylon analyzer circuitry 208 determines the APUSI based on the occurrence of the flight regimes (e.g., climb, descent, bank turn, acceleration, etc.) and their associated damage rates. The aft pylon analyzer circuitry 208 also uses DUS damage rates and flight conditions received from the data receiver circuitry 202. Based on the flight of the aircraft 100 (e.g., ground run flight, airborne flight) and the duration of the flight (e.g., less than half an hour), the aft pylon analyzer circuitry 208 identifies the APUSI in accordance with the aft pylon usage severity criteria, as described in more detail in connection with FIG. 6.

The severity index identifier circuitry 210 determines a combined usage severity index for an individual flight, an individual aircraft, or a fleet of aircraft. For example, the severity index identifier circuitry 210 identifies an overall usage severity index that can be used to evaluate and/or validate an aircraft fleet's existing design usage spectrum and improve the safety and reliability of fatigue life-limited components. For example, the generated usage severity index can be used to determine helicopter maintenance actions or inspections on flight critical components. In some examples, the severity index identifier circuitry 210 generates a drive system severity index, an aft rotor severity index, an aft pylon severity index, and/or a forward rotor severity index for a variety of flights and aircraft configurations. However, a severity index can be generated for any other component and/or structure of the aircraft 100 based on available data input(s) from onboard data collection systems (e.g., flight data recorder, etc.).

The output generator circuitry 212 outputs graphical representations of the usage severity indices generated for a given flight and/or aircraft configuration. For example, the output generator circuitry 212 provides a severity ranking that allows for a comparison of aircraft 100 performance across various flights, as shown in connection with FIGS. 8 and 11. In some examples, the output generator circuitry 212 generates graphical representations of data processing results (e.g., structural usage monitoring system data) used for the generation of system-based usage severity indices, as shown in more detail in connection with FIGS. 9 and 10.

The data storage 214 can be used to store any information associated with the data receiver circuitry 202, drive system analyzer circuitry 204, rotor system analyzer circuitry 206, pylon analyzer circuitry 208, severity index identifier circuitry 210, and/or output generator circuitry 212. The example data storage 214 of the illustrated example of FIG. 2 can be implemented by any memory, storage device and/or storage disc for storing data such as flash memory, magnetic media, optical media, etc. Furthermore, the data stored in the example data storage 214 can be in any data format such as binary data, comma delimited data, tab delimited data, structured query language (SQL) structures, image data, etc.

In some examples, the apparatus includes means for receiving data. For example, the means for receiving data may be implemented by the data receiver circuitry 202. In some examples, the data receiver circuitry 202 may be instantiated by processor circuitry such as the example processor circuitry 1212 of FIG. 12. For instance, data receiver circuitry 202 may be instantiated by the example microprocessor 1300 of FIG. 13 executing machine executable instructions such as those implemented by at least block 315 of FIG. 3. In some examples, the data receiver circuitry 202 may be instantiated by hardware logic circuitry, which may be implemented by an ASIC, XPU, or the FPGA circuitry 1300 of FIG. 13 structured to perform operations corresponding to the machine readable instructions. Additionally or alternatively, the data receiver circuitry 202 may be instantiated by any other combination of hardware, software, and/or firmware. For example, the data receiver circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for analyzing a drive system. For example, the means for analyzing a drive system may be implemented by drive system analyzer circuitry 204. In some examples, the drive system analyzer circuitry 204 may be instantiated by processor circuitry such as the example processor circuitry 1212 of FIG. 12. For instance, the drive system analyzer circuitry 204 may be instantiated by the example microprocessor 1300 of FIG. 13 executing machine executable instructions such as those implemented by at least block 320 of FIG. 3. In some examples, the drive system analyzer circuitry 204 may be instantiated by hardware logic circuitry, which may be implemented by an ASIC, XPU, or the FPGA circuitry 1300 of FIG. 13 structured to perform operations corresponding to the machine readable instructions. Additionally or alternatively, the drive system analyzer circuitry 204 may be instantiated by any other combination of hardware, software, and/or firmware. For example, the drive system analyzer circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for analyzing a rotor system. For example, the means for analyzing a rotor system may be implemented by rotor system analyzer circuitry 206. In some examples, the rotor system analyzer circuitry 206 may be instantiated by processor circuitry such as the example processor circuitry 1212 of FIG. 12. For instance, the rotor system analyzer circuitry 206 may be instantiated by the example microprocessor 1300 of FIG. 13 executing machine executable instructions such as those implemented by at least block 325 of FIG. 3. In some examples, the rotor system analyzer circuitry 206 may be instantiated by hardware logic circuitry, which may be implemented by an ASIC, XPU, or the FPGA circuitry 1300 of FIG. 13 structured to perform operations corresponding to the machine readable instructions. Additionally or alternatively, the rotor system analyzer circuitry 206 may be instantiated by any other combination of hardware, software, and/or firmware. For example, the rotor system analyzer circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for analyzing a pylon. For example, the means for analyzing a pylon may be implemented by pylon analyzer circuitry 208. In some examples, the pylon analyzer circuitry 208 may be instantiated by processor circuitry such as the example processor circuitry 1212 of FIG. 12. For instance, the pylon analyzer circuitry 208 may be instantiated by the example microprocessor 1300 of FIG. 13 executing machine executable instructions such as those implemented by at least block 330 of FIG. 3. In some examples, the pylon analyzer circuitry 208 may be instantiated by hardware logic circuitry, which may be implemented by an ASIC, XPU, or the FPGA circuitry 1300 of FIG. 13 structured to perform operations corresponding to the machine readable instructions. Additionally or alternatively, the pylon analyzer circuitry 208 may be instantiated by any other combination of hardware, software, and/or firmware. For example, the pylon analyzer circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a severity index. For example, the means for identifying a usage severity index may be implemented by severity index identifier circuitry 210. In some examples, the severity index identifier circuitry 210 may be instantiated by processor circuitry such as the example processor circuitry 1212 of FIG. 12. For instance, the severity index identifier circuitry 210 may be instantiated by the example microprocessor 1300 of FIG. 13 executing machine executable instructions such as those implemented by at least block 350 of FIG. 3. In some examples, the severity index identifier circuitry 210 may be instantiated by hardware logic circuitry, which may be implemented by an ASIC, XPU, or the FPGA circuitry 1300 of FIG. 13 structured to perform operations corresponding to the machine readable instructions. Additionally or alternatively, the severity index identifier circuitry 210 may be instantiated by any other combination of hardware, software, and/or firmware. For example, the severity index identifier circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating data output. For example, the means for generating data output may be implemented by output generator circuitry 212. In some examples, the output generator circuitry 212 may be instantiated by processor circuitry such as the example processor circuitry 1212 of FIG. 12. For instance, the output generator circuitry 212 may be instantiated by the example microprocessor 1300 of FIG. 13 executing machine executable instructions such as those implemented by at least block 355 of FIG. 3. In some examples, the output generator circuitry 212 may be instantiated by hardware logic circuitry, which may be implemented by an ASIC, XPU, or the FPGA circuitry 1300 of FIG. 13 structured to perform operations corresponding to the machine readable instructions. Additionally or alternatively, the output generator circuitry 212 may be instantiated by any other combination of hardware, software, and/or firmware. For example, the output generator circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the usage severity index generator circuitry 150 of FIG. 1 is illustrated in FIG. 2, one or more of the elements, processes and/or devices illustrated in FIG. 2 may be combined, divided, re-arranged, omitted, eliminated and/or implemented in any other way. Further, the example data receiver circuitry 202, example drive system analyzer circuitry 204, example rotor system analyzer circuitry 206, example pylon analyzer circuitry 208, example severity index identifier circuitry 210, example output generator circuitry 212, and/or, more generally, the example usage severity index generator circuitry 150 of FIG. 1 may be implemented by hardware, software, firmware and/or any combination of hardware, software and/or firmware. Thus, for example, any of the data receiver circuitry 202, drive system analyzer circuitry 204, rotor system analyzer circuitry 206, pylon analyzer circuitry 208, severity index identifier circuitry 210, output generator circuitry 212, and/or, more generally, the usage severity index generator circuitry 150 of FIG. 1 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example usage severity index generator circuitry 150 of FIG. 1 may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed to configure processor circuitry to implement the usage severity index generator circuitry 150 of FIG. 1 are shown in FIGS. 3, 4, 5, and 6. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIG. 3, 4, 5, 6, many other methods of implementing the example usage severity index generator circuitry 150 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
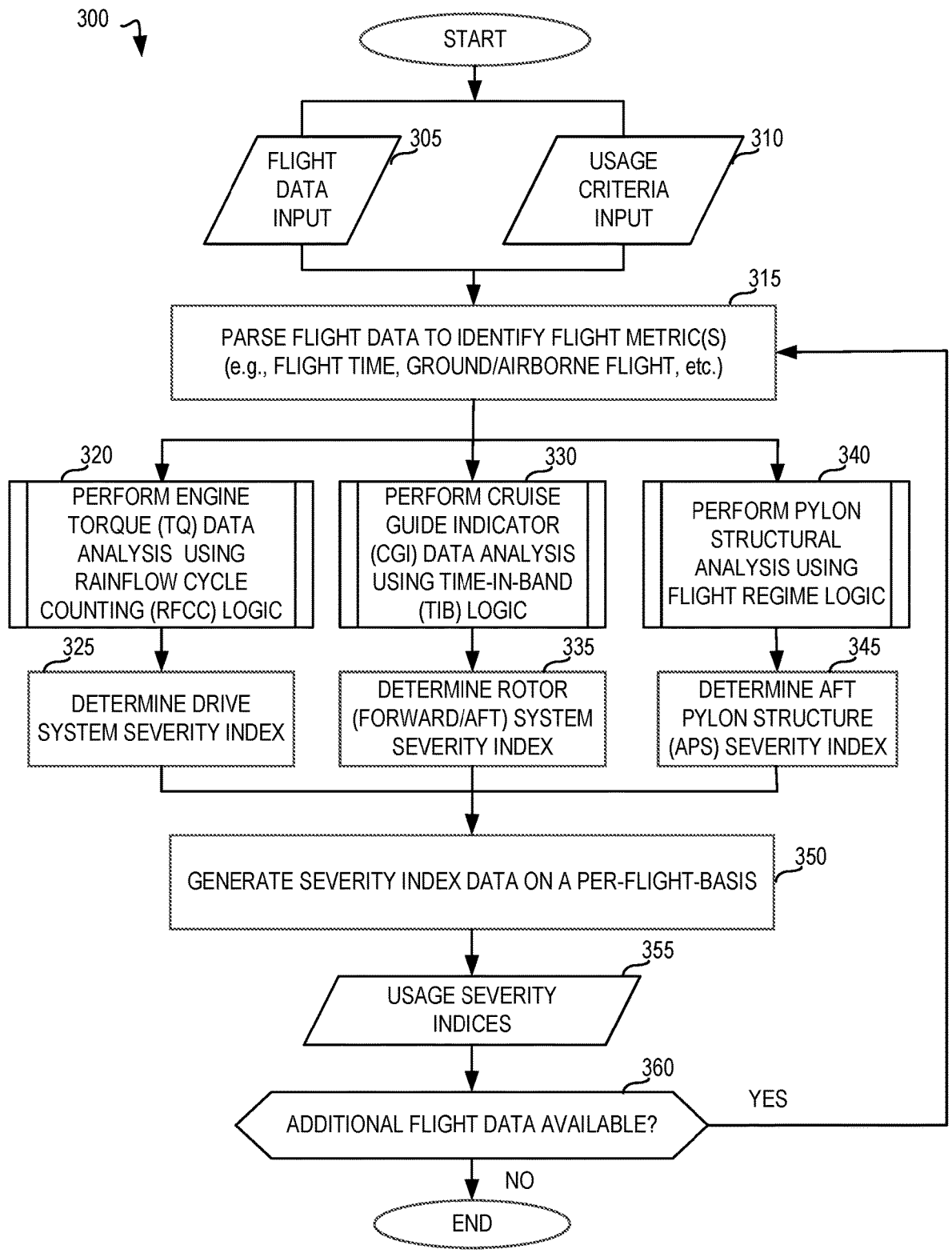
FIG. 3 is a flowchart representative of machine-readable instructions which may be executed to implement the example usage severity index generator circuitry of FIG. 2 to generate usage severity indices in accordance with teachings disclosed herein.

FIG. 3 is a flowchart representative of example machine-readable instructions and/or operations 300 which may be executed and/or instantiated by processor circuitry to implement the example usage severity index generator circuitry 150 of FIG. 2. The machine readable instructions and/or the operations 300 of FIG. 3 begin at block 315, at which the data receiver circuitry 202 of FIG. 2 receives flight data input 305 and usage criteria input 310 (e.g., from an onboard data collection system and/or a flight data collection system). The data receiver circuitry 202 parses the flight data to identify parameter(s) associated with the flight data (e.g., flight time, torque data, cruise guide indicator data, flight regimes, etc.). Based on the identified flight information, the drive system analyzer circuitry 204 performs engine torque (TQ) data analysis (e.g., using rain flow cycle counting (RFCC) logic) at block 320, and determines a drive system usage severity index (DSUSI), at block 325. For example, the drive system analyzer circuitry 204 identifies the DSUSI values based on torque data, flight type, and flight duration, as described in more detail in connection with FIG. 4. Similarly, the rotor system analyzer circuitry 206 performs cruise guide indicator (CGI) data analysis (e.g., using time-in-band logic) at block 330, and determines a rotor system usage severity index (RSUSI) at block 335. For example, the rotor system analyzer circuitry 206 identifies the RSUSI values based on cruise guide indicator data, rotor damage data, flight type, and flight duration, as described in more detail in connection with FIG. 5. The pylon analyzer circuitry 208 performs pylon structural analysis (e.g., using flight regime logic) at block 340, and determines an aft pylon structure (APS) severity index at block 345. For example, the pylon analyzer circuitry 208 identifies the APUSI values based on flight regime data, damage rate data associated with the flight regimes, flight type, and/or flight duration, as described in more detail in connection with FIG. 6.

Based on the generated usage severity indices for the various systems of aircraft 100 of FIG. 1 (e.g., drive system, rotor system, aft pylon, etc.), the severity index identifier circuitry 210 generates severity index data on a per-flight-basis at block 350. In some examples, the severity index identifier circuitry 210 generates severity index data for an aircraft fleet to allow for evaluation of system components and/or aircraft structures to determine the need for post-flight maintenance. As such, rapid data-driven feedback and insight into aircraft usage on a per-flight basis can be obtained using the usage severity index generator circuitry 150. For example, the generated data can be used to determine helicopter maintenance actions or inspections on flight critical components. Helicopter reliability and safety can be enhanced through consideration of possible fatigue failure modes based on the structural integrities of the critical dynamic components and airframe structures. In some examples, the usage severity index can be implemented on ground-based station software for fleet data analyses and/or in combination with other software systems (e.g., Condition Based Maintenance (CBM) and Integrated Vehicle Health Management (IVHM)). The methods and apparatus disclosed herein permit the usage severity index generator circuitry 150 to adapt to any type of critical dynamic and airframe structural parts. In the example of FIG. 3, the severity index identifier circuitry 210 outputs the usage severity indices 355 based on the available flight data from a flight data recorder (FDR). Furthermore, the output generator circuitry 212 provides graphical representations of the usage severity indices 355 for each of the aircraft 100 systems (e.g., drive system, rotor system, etc.). In some examples, if additional flight data is available at block 360, the usage severity index generator circuitry 150 processes the FDR data of multiple flights and/or aircraft configurations. In some examples, the usage severity indices 355 can be validated against data available from previous flight test programs. For example, the usage severity index generator circuitry 150 can be used to validate the suitability of current design usage spectrums and improve the safety and reliability of fatigue life-limited components.

Figure 4:
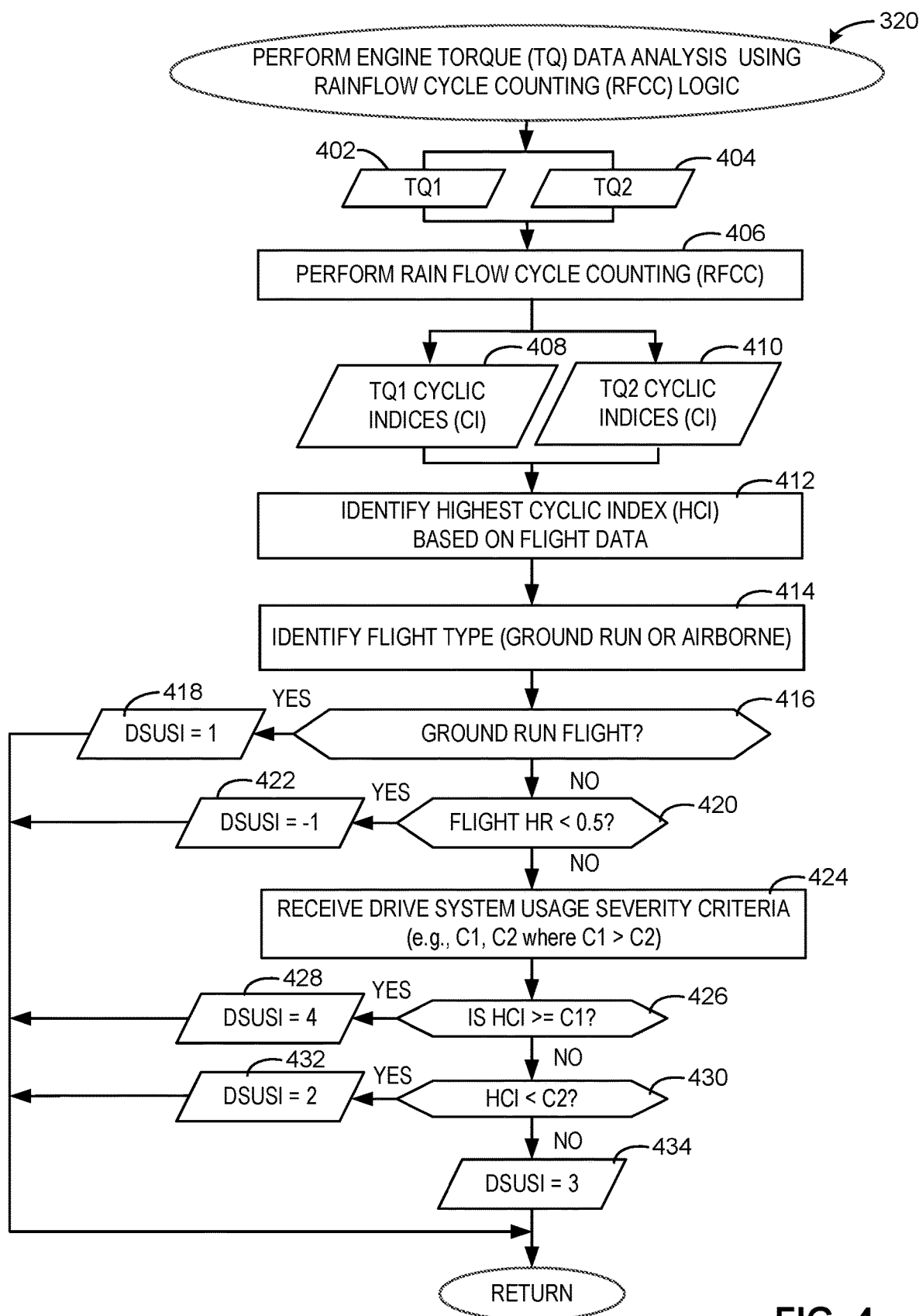
FIG. 4 is a flowchart representative of machine-readable instructions which may be executed to implement the example usage severity index generator circuitry of FIG. 2 to perform engine torque data analysis to determine a drive system usage severity index (DSUSI).

FIG. 4 is a flowchart representative of machine-readable instructions 320 which may be executed to implement the example usage severity index generator circuitry 150 of FIG. 2 to perform engine torque data analysis to determine a drive system usage severity index (DSUSI). In the example of FIG. 4, the data receiver circuitry 202 receives engine torque (TQ) data related to aircraft 100 of FIG. 1 (e.g., accessed from a flight data recorder via the network 130). In some examples, the TQ data includes data for more than one engine. In the example of FIG. 4, the data receiver circuitry 202 retrieves torque data for two engines (e.g., TQ1 input 402 and TQ2 input 404). The drive system analyzer circuitry 204 performs rain flow cycle counting (RFCC) using the TQ1 and TQ2 inputs at block 406. For example, the drive system analyzer circuitry 204 performs RFCC to determine significant torque changes over time, as shown in more detail in connection with FIG. 9. In the example of FIG. 4, the drive system analyzer circuitry 204 outputs torque cyclic indices for each engine of the aircraft 100 (e.g., TQ1 cyclic indices (CI) 408, TQ2 cyclic indices 410) as a result of the RFCC method used to calculate the fatigue life of an aircraft component, as shown in connection with FIG. 10. Based on the TQ1 CI 408 and the TQ2 CI 410, the drive system analyzer circuitry 204 identifies the highest cyclic index (HCI), at block 412. For example, the HCI can correspond to the highest CI of the sixth highest CI/hour between TQ1 and TQ2, as determined based on the flight hours and flight conditions of the aircraft 100. In the example of FIG. 4, the cycle counting excludes the Ground-Air-Ground (GAG) cycle given that this cycle is the highest torque cycle experienced during each flight. As such, the HCI identified from the available aircraft 100 engines is used to determine the drive system usage severity index.

For example, the drive system analyzer circuitry 204 proceeds to identify the DSUSI based on the HCI by first determining the flight type (e.g., ground run or airborne), at block 414. If the drive system analyzer circuitry 204 determines that the flight type is a ground run flight at block 416, the DSUSI output 418 is one (e.g., DSUSI=1). If the drive system analyzer circuitry 204 determines that the flight is an airborne flight and the flight length is less than half of an hour (e.g., HR<0.5) at block 420, the DSUSI output 422 is minus one (e.g., DSUSI=−1). However, if the flight duration is longer than half of an hour, the drive system analyzer circuitry 204 determines the remaining DSUSI output(s) based on drive system usage severity criteria and the identified HCI. For example, the drive system analyzer circuitry 204 receives the drive system usage severity criteria (e.g., C1, C2, where C1>C2) at block 424, the usage severity criteria identifying HCI values that determine the resulting DSUSI output values. In the example of FIG. 4, if the HCI value is greater than or equal to the C1 value (e.g., HCI>=C1, where C1>C2) at block 426, the drive system analyzer circuitry 204 outputs a high DSUSI output 428 (e.g., DSUSI=4). If the HCI value is less than the C1 value (e.g., HCI<C1) at block 426, the drive system analyzer circuitry 204 determines whether the HCI value is less than the C2 value (e.g., HCI<C2, where C1>C2) at block 430. If the HCI value is less than the C2 value, the drive system analyzer circuitry 204 outputs a lower DSUSI output 432 (e.g., DSUSI=2) compared to the DSUSI output 428. If the HCI value is greater than the C2 value, the drive system analyzer circuitry 204 outputs a lower DSUSI output 434 (e.g., DSUSI=3) compared to the DSUSI output 428 but a higher DSUSI output compared to the DSUSI output 432. As such, the higher the DSUSI number, the higher the usage severity for the drive system.

Figure 5:
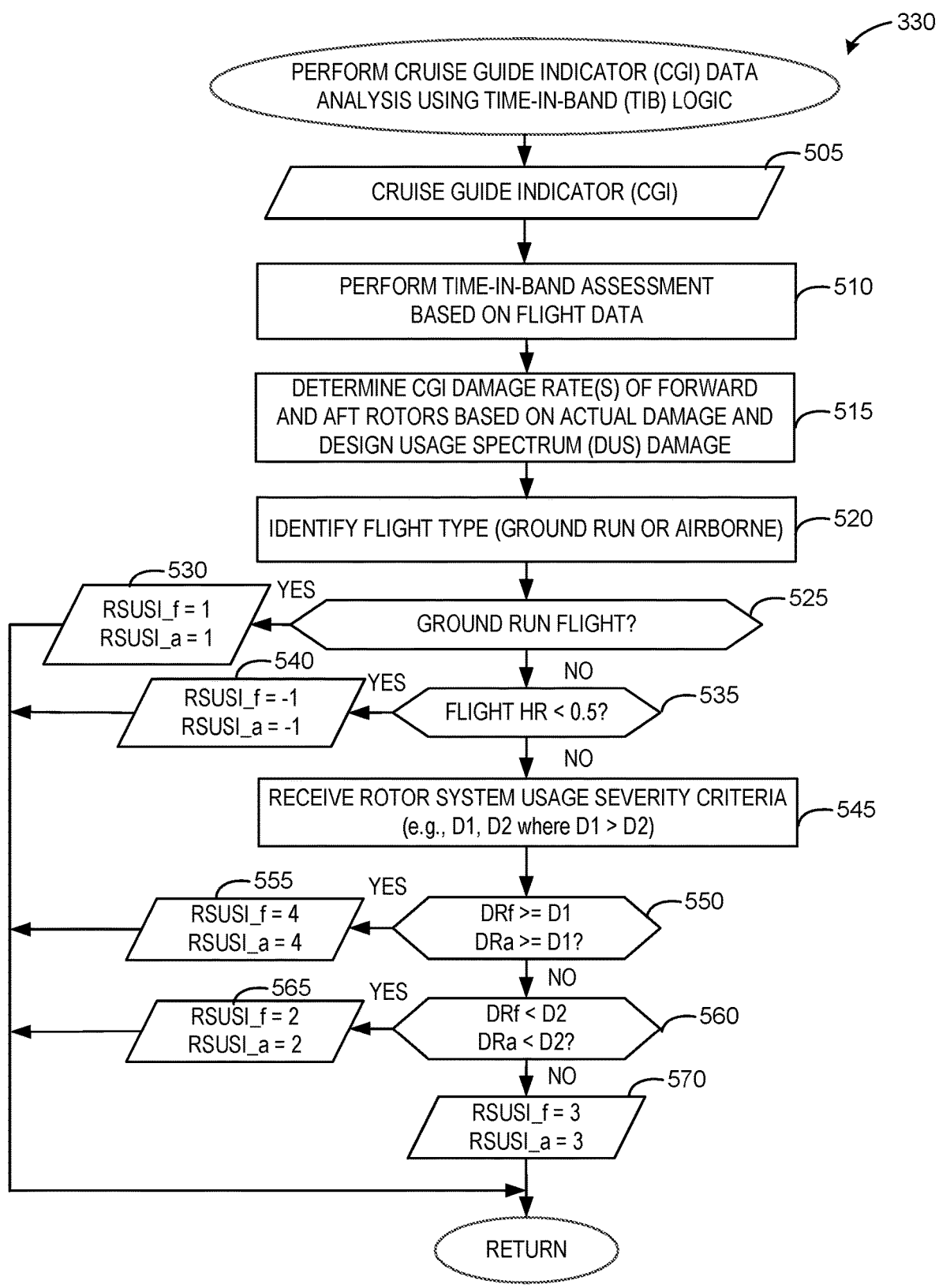
FIG. 5 is a flowchart representative of machine-readable instructions which may be executed to implement the example usage severity index generator circuitry of FIG. 2 to perform cruise guide indicator (CGI) data analysis to determine a rotor system usage severity index (RSUSI).

FIG. 5 is a flowchart representative of machine-readable instructions 325 which may be executed to implement the example usage severity index generator circuitry 150 of FIG. 2 to perform CGI data analysis to determine the forward and aft rotor system usage severity indices (RSUSI). In the example of FIG. 5, the data receiver circuitry 202 receives cruise guide indicator (CGI) data 505. The CGI data 505 serves as a key state parameter that measures alternating loads on the rotor system of the aircraft 100. The rotor system analyzer circuitry 206 performs a time-in-band assessment based on the flight data, at block 510. For example, the CGI includes normal operation, transient operation, and operation that should be avoided based on actual loads imposed on critical components of the aircraft 100 (e.g., helicopter) dynamic system. For example, the CGI system allows a pilot to achieve maximum aircraft 100 utilization under various conditions of payload, altitude, air speed, ambient temperature, and center-of-gravity. In some examples, strain gages of the CGI are bonded to fixed links in the forward and aft rotor controls of the aircraft 100, with an indicator, a signal processing unit in the aft pylon, and a signal conditioner unit in the forward pylon.

Based on the time-in-band assessment, the usage severity index generator circuitry 150 determines CGI-based damage rate(s) of the forward and/or the aft rotors using actual damage and design usage spectrum (DUS) damage, at block 515. For example, usage severities between forward and aft rotors are distinguished by the damage rate differences of the rotor components. Based on known CGI damage rates of forward and aft rotors and flight-based information (e.g., flight hours, flight condition), the rotor system analyzer circuitry 206 determines the forward rotor actual damage (e.g., cgiADf) and the aft rotor actual damage (e.g., cgiADa). Furthermore, the rotor system analyzer circuitry 206 determines an overall damage rate for the forward rotor (e.g., DRf) and an overall damage rate for the aft rotor (e.g., DRa) based on a ratio of the CGI-based actual damage and the design usage spectrum damage for the aft rotor (DUSDa) and the forward rotor (DUSDf) (e.g., forward rotor damage rate, DRf=cgiADf/DUSDf and aft rotor damage rate, DRa=cgiADa/DUSDa).

Once the damage rates for the aft rotor and the forward rotor are determined, the rotor system analyzer circuitry 206 proceeds to identify the RSUSI based on the damage rates (e.g., DRf, DRa) by first determining the flight type (e.g., ground run or airborne), at block 520. If the rotor system analyzer circuitry 206 determines that the flight type is a ground run flight at block 525, the RSUSI output 530 for the forward and aft rotors is one (e.g., RSUSI_f=1, RSUSI_a=1). If the rotor system analyzer circuitry 206 determines that the flight is an airborne flight and the flight length is less than half of an hour (e.g., HR<0.5) at block 535, the RSUSI output 540 is minus one (e.g., RSUSI_f=−1, RSUSI_a=−1). However, if the flight duration is longer than half of an hour, the rotor system analyzer circuitry 206 determines the remaining RSUSI output(s) based on rotor system usage severity criteria and the identified damage rates. For example, the rotor system analyzer circuitry 206 receives the rotor system usage severity criteria (e.g., D1, D2, where D1>D2) at block 545, the usage severity criteria identifying damage rate values (e.g., DRf, DRa) that determine the resulting RSUSI output values. In the example of FIG. 5, if the forward rotor/aft rotor damage rate value is greater than or equal to the D1 value (e.g., DRf, DRa>=D1, where D1>D2) at block 550, the rotor system analyzer circuitry 206 outputs a high RSUSI output 555 (e.g., RSUSI_f=4, RSUSI_a=4). If the damage rate value is less than the D1 value (e.g., DRf, DRa<D1) at block 550, the rotor system analyzer circuitry 206 determines whether the damage rate value is less than the D2 value (e.g., DRf, DRa<D2, where D1>D2) at block 560. If the damage rate value is less than the D2 value, the rotor system analyzer circuitry 206 outputs a lower RSUSI output 565 (e.g., RSUSI_f=2, RSUSI_a=2) compared to the RSUSI output 555. If the damage rate value is greater than the D2 value, the rotor system analyzer circuitry 206 outputs a lower RSUSI output 570 (e.g., RSUSI=3) compared to the RSUSI output 555 but a higher RSUSI output compared to the RSUSI output 565. As such, the higher the RSUSI number, the higher the usage severity for the rotor system.

Figure 6:
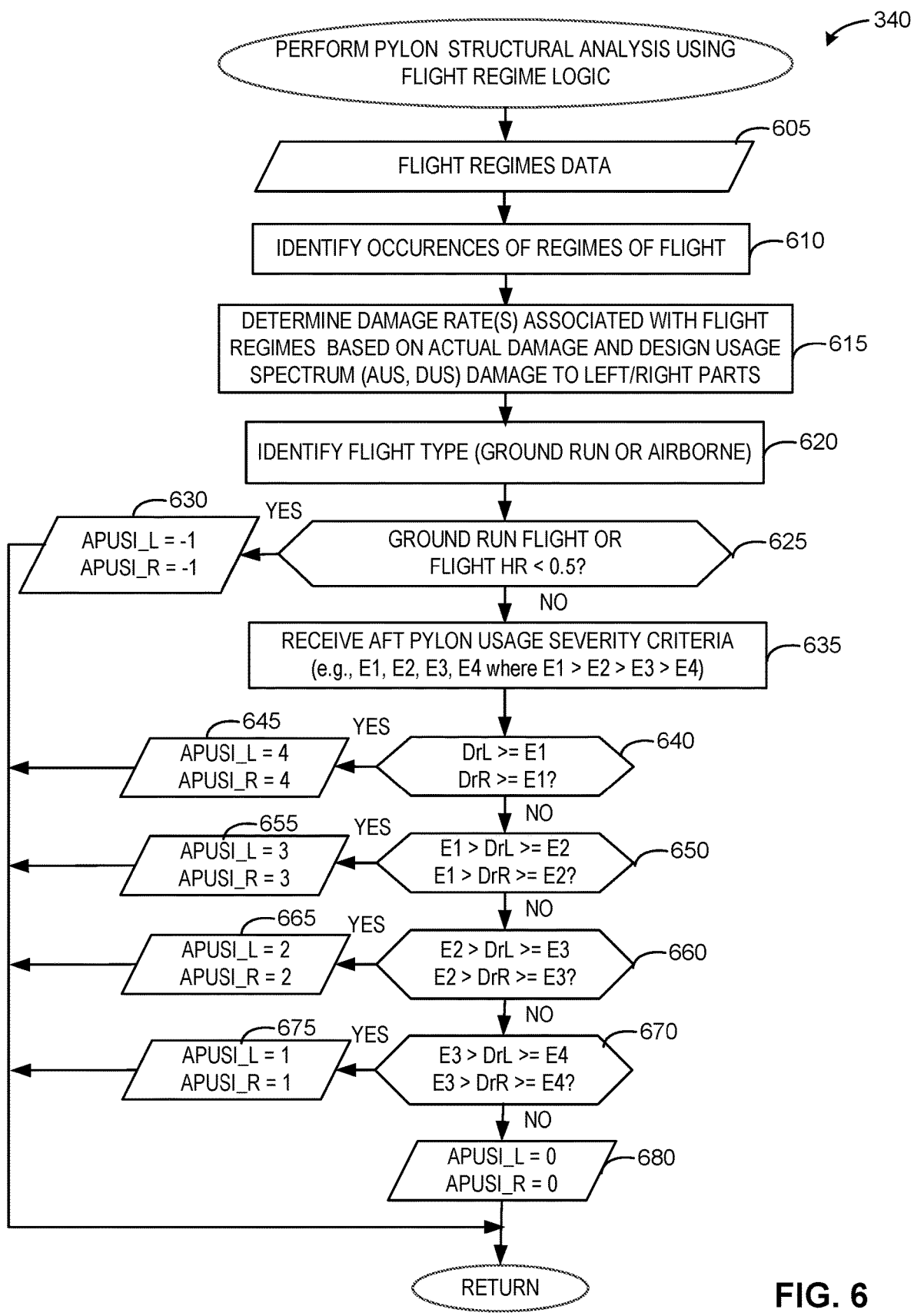
FIG. 6 is a flowchart representative of machine-readable instructions which may be executed to implement the example usage severity index generator circuitry of FIG. 2 to perform flight regime analysis to determine an aft pylon usage severity index (APUSI).

FIG. 6 is a flowchart representative of machine-readable instructions 330 which may be executed to implement the example usage severity index generator circuitry 150 of FIG. 2 to perform pylon structural analysis to determine an aft pylon usage severity index (APUSI). In the example of FIG. 6, the data receiver circuitry 202 receives flight regime data 605 associated with the aircraft 100. For example, the flight regime data includes aircraft maneuvers, including climbing, descending, bank turning, accelerating, decelerating, pullups, pushovers, etc. The pylon analyzer circuitry 208 identifies a number of occurrences of the different flight regimes (nOcc) associated with the aircraft 100 based on the flight regime data 605, at block 610. For example, the pylon analyzer circuitry 208 uses occurrences of the flight regimes (nOcc) and their associated damage rates (e.g., damage rates of flight regimes per nOcc for left and right parts of the aircraft 100) in the determination of the APUSI. The APUSI calculation also depends on DUS damage rates, flight conditions and severity criteria. The left and right component severities of the aircraft 100 are distinguished by the different damage rates of the left and right parts (e.g., where DmgL=left part damage and DmgR=right part damage). In the example of FIG. 6, the pylon analyzer circuitry 208 determines a damage ratio for the left parts (DrL) and a damage ratio for the right parts (DrR) based on a ratio of the actual damage to the DUS-based damage for the left parts (dusDmgL) and the right parts (dusDmgR) (e.g., DrL=DmgL/dusDmgL and DrR=DmgR/dusDmgR), at block 615.

Once the damage rates for the left and right parts are determined, the pylon analyzer circuitry 208 proceeds to identify the APUSI based on the damage rates (e.g., DrL, DrR) by first determining the flight type (e.g., ground run or airborne), at block 620. If the pylon analyzer circuitry 208 determines that the flight type is a ground run flight or the flight duration is less than half of an hour (e.g., HR<0.5), at block 625, the APUSI output 630 for the left and right parts is negative one (e.g., APUSI_L=−1, APUSI_R=−1). If the pylon analyzer circuitry 208 determines that the flight is an airborne flight and/or the flight length is longer than half of an hour, at block 625, the pylon analyzer circuitry 208 determines the remaining APUSI output(s) based on aft pylon usage severity criteria and the identified damage rates. For example, the pylon analyzer circuitry 208 receives the aft pylon usage severity criteria (e.g., E1, E2, E3, E4 where E1>E2>E3>E4) at block 635, the usage severity criteria identifying damage rate values (e.g., DrL, DrR) that determine the resulting APUSI output values.

In the example of FIG. 6, if the left part/right part damage rate value is greater than or equal to the E1 value (e.g., DrL, DrR>=E1) at block 640, the pylon analyzer circuitry 208 outputs a high APUSI output 645 (e.g., APUSI_L=4, APUSI_R=4). If the damage rate value is less than the E1 value (e.g., DrL, DrR<E1) at block 640, the pylon analyzer circuitry 208 determines whether the damage rate value is less than the E1 value but greater than or equal to the E2 value (e.g., E1>DrL, DrR>=E2) at block 650. If the damage rate value is less than the E1 value and greater than or equal to the E2 value, the pylon analyzer circuitry 208 outputs a lower APUSI output 655 (e.g., APUSI_L=3, APUSI_R=3) compared to the APUSI output 645. Otherwise, the pylon analyzer circuitry 208 determines whether the damage rate value is less than the E2 value but greater than or equal to the E3 value (e.g., E2>DrL, DrR>=E3) at block 660. If the damage rate value is less than the E2 value and greater than or equal to the E3 value, the pylon analyzer circuitry 208 outputs a lower APUSI output 665 (e.g., APUSI_L=2, APUSI_R=2) compared to the APUSI output(s) 645, 655. The pylon analyzer circuitry 208 proceeds to determine whether the damage rate value is less than the E3 value but greater than or equal to the E4 value (e.g., E4>DrL, DrR>=E4) at block 670. If the damage rate value is less than the E3 value and greater than or equal to the E4 value, the pylon analyzer circuitry 208 outputs a lower APUSI output 675 (e.g., APUSI_L=1, APUSI_R=1) compared to the APUSI output(s) 645, 655, 665. Otherwise, the pylon analyzer circuitry 208 produces an APUSI output 680 with the lowest APUSI value (e.g., APUSI_L=0, APUSI_R=0). As such, the higher the APUSI number, the higher the usage severity for the aft pylon structure.

Figure 7:
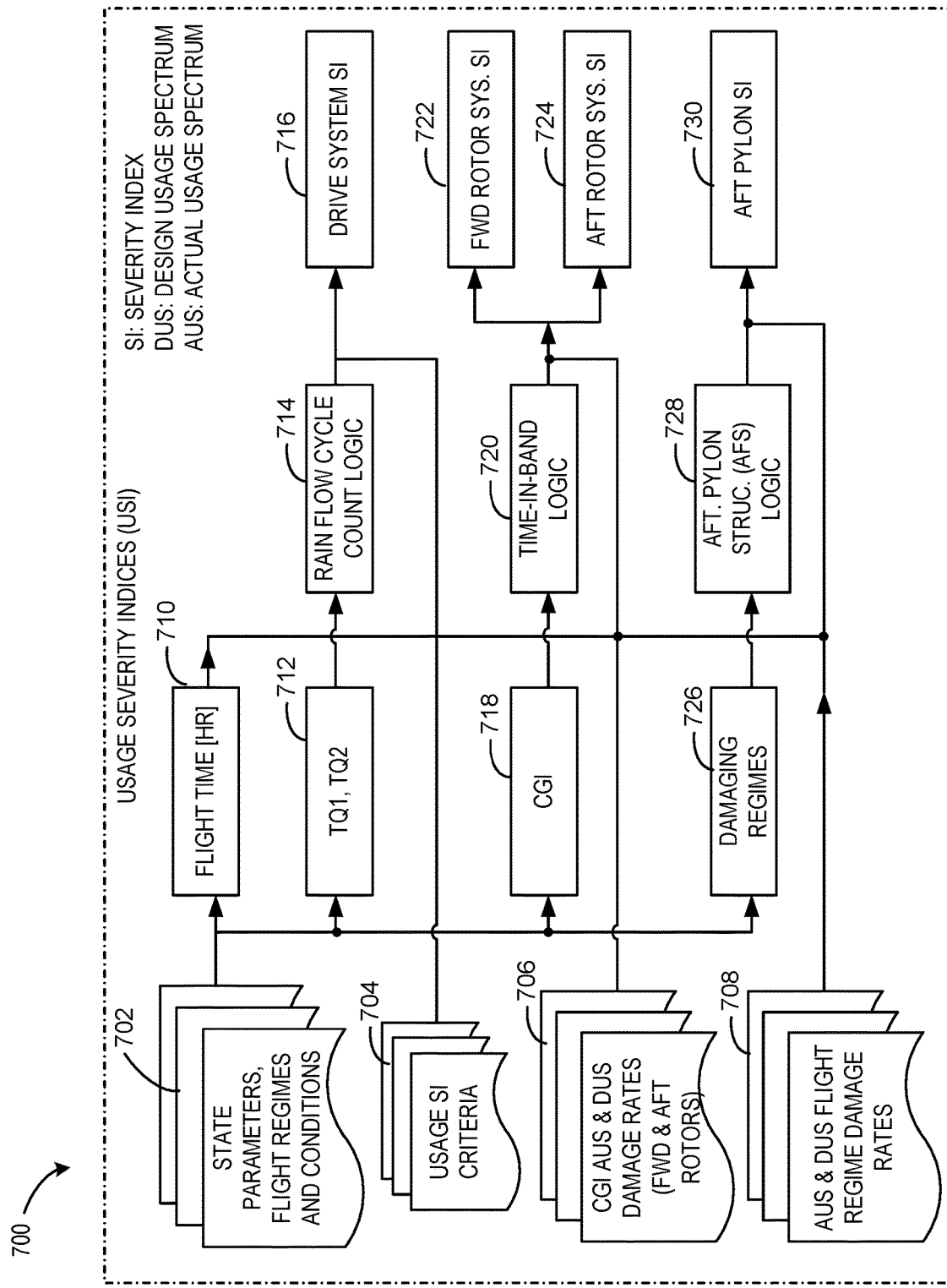
FIG. 7 illustrates an example diagram of algorithm logic used to generate the usage severity index in accordance with the flowcharts of FIGS. 3, 4, 5, and/or 6.

FIG. 7 illustrates an example diagram 700 of algorithm logic used to generate the usage severity index in accordance with the flowcharts of FIGS. 3, 4, 5, and/or 6. As shown in the example of FIG. 7, the usage severity index generator circuitry 150 receives input(s) relating to the flight information associated with the aircraft 100 of FIG. 1, including usage severity index criteria. For example, the data receiver circuitry 202 receives (1) state parameters (e.g., torque data), flight regimes, and/or flight conditions input 702, (2) usage severity index (SI) criteria input 704 (e.g., drive system usage SI criteria, rotor system usage SI criteria, pylon system usage SI criteria, etc.), (3) cruise guide indicator (CGI) actual usage spectrum (AUS) damage rate and design usage spectrum (DUS) damage rate (e.g., for forward and aft rotors) input 706, and (4) AUS and DUS flight regime damage rates input 708. For example, the calculated actual damages are compared to the damages of the design usage spectrum to determine the usage severities for the critical dynamic components and airframe structures.

As described in connection with FIG. 4, the drive system analyzer circuitry 204 uses flight time data 710 and engine torque (e.g., TQ1, TQ2) data 712 identified from input 702 to perform rain flow cycle counting logic 714 to identify the drive system severity index output 716 (e.g., DSUSI) based on the drive system usage SI criteria. As described in connection with FIG. 5, the rotor system analyzer circuitry 206 uses CGI input 718 to perform time-in-band logic 720 to identify the rotor system severity index output(s) 722, 724 for the forward rotor (e.g., RSUSI_f) and for the aft rotor (e.g., RSUSI_a) based on the rotor system usage SI criteria. Likewise, as described in connection with FIG. 6, the pylon analyzer circuitry 208 uses damaging regimes input 726 to perform aft pylon structure logic 728 to identify the aft pylon severity index output 730 for the left parts of the aircraft 100 (e.g., APUSI_L) and/or for the right parts of the aircraft 100 (e.g., APUSI_R) based on the pylon usage SI criteria. As such, the usage severity indices provide indices for flight critical, fatigue life-limited dynamic (e.g., drive system and rotor system) components and/or airframe (e.g., aft pylon) structures based on selected state parameters, the identified flight regimes and conditions, as well as fatigue damage rates of the critical dynamic components and airframe structures due to actual usage (e.g., based on flight test loads and simulation data).

Figure 8:
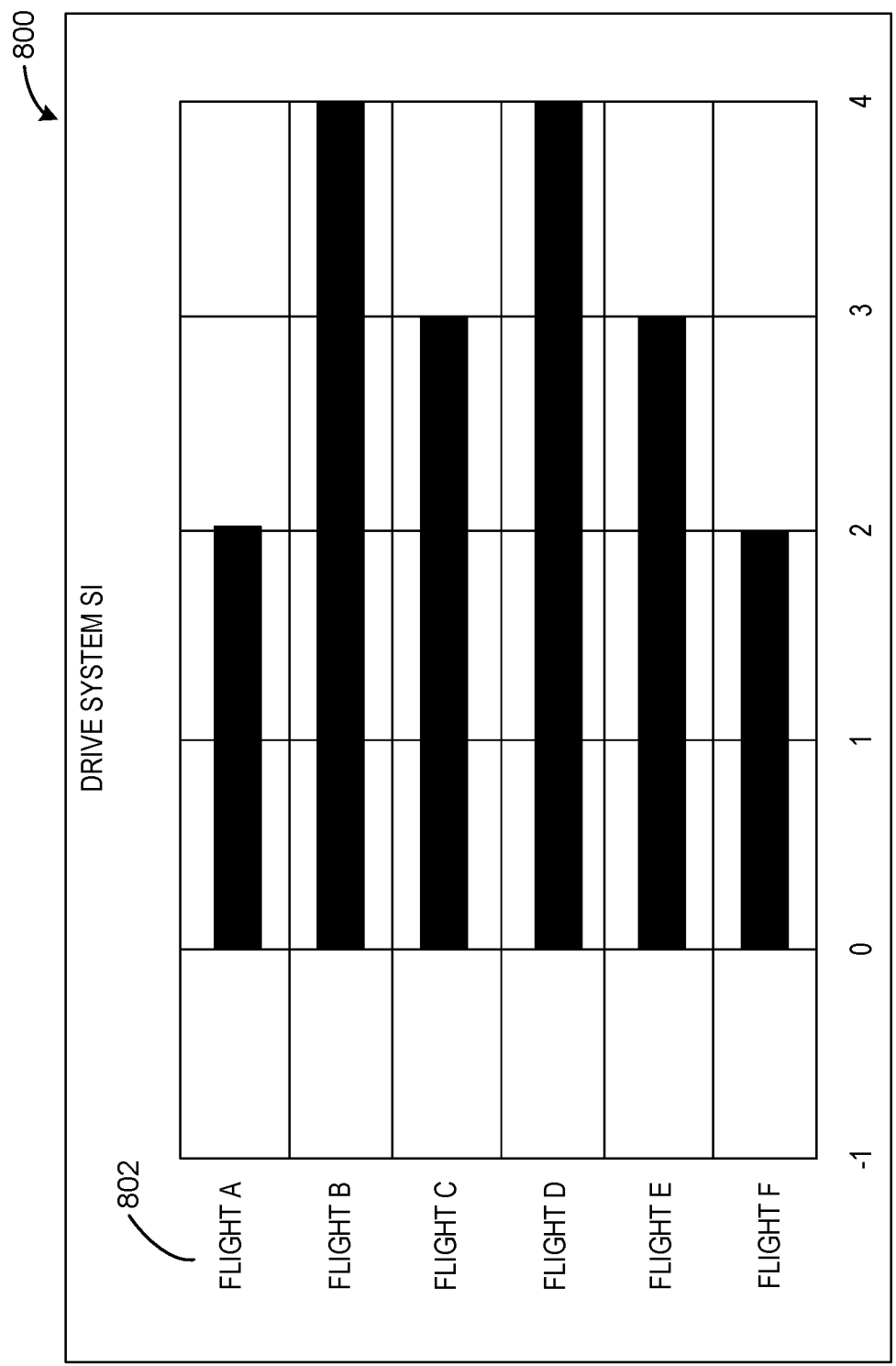
FIG. 8 illustrates example drive system usage severity drive indices generated in accordance with the flowchart of FIG. 4.

FIG. 8 illustrates an example usage severity drive index 800 generated in accordance with the flowcharts of FIGS. 3, 4, 5, and/or 6. In the example of FIG. 8, a drive system usage severity index is shown for flight data 802 (e.g., flights A-F). As described in connection with FIG. 4, the drive system analyzer circuitry 204 identifies a drive system usage index (DSUSI) based on flight information and drive system-based usage severity criteria. Subsequently, the severity index identifier circuitry 210 associates the determined indices with various flights of the aircraft 100 and/or various aircraft 100 fleets. The output generator circuitry 212 outputs a graphical representation of the usage severity indices, as shown in the example of FIG. 8, where the highest DSUSI are observed for flights B and D (e.g., DSUSI=4), and the lower DSUSI are observed for flights A and F (e.g., DSUSI=2).

Figure 9:
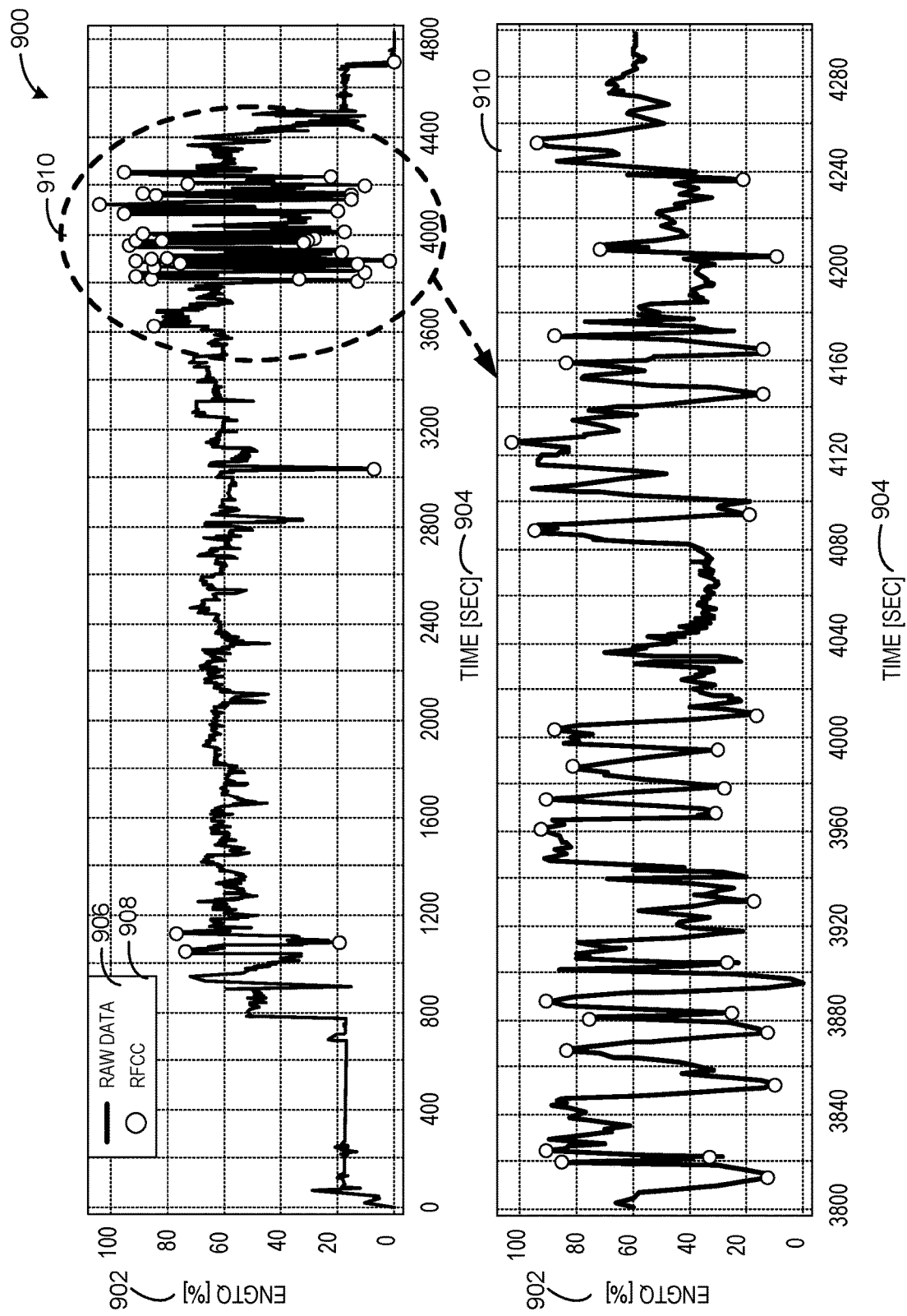
FIG. 9 illustrates an example graphical representation of engine torque (TQ) data and corresponding inflection points from rain flow cycle counting (RFCC) logic.

FIG. 9 illustrates an example graphical representation 900 of torque (TQ) data and corresponding inflection points from rain flow cycle counting (RFCC) logic. In the example of FIG. 9, raw data 906 representative of engine torque data 902 is shown over time 904, with RFCC inflection points 908 identified throughout the raw data 906. An example expanded view 910 of the raw data 906 indicates the highest engine torque measurements recorded during a particular flight of the aircraft 100. As such, the drive system analyzer circuitry 204 uses these torque measurements as part of the DSUSI identification, as described in connection with FIG. 4.

Figure 10:
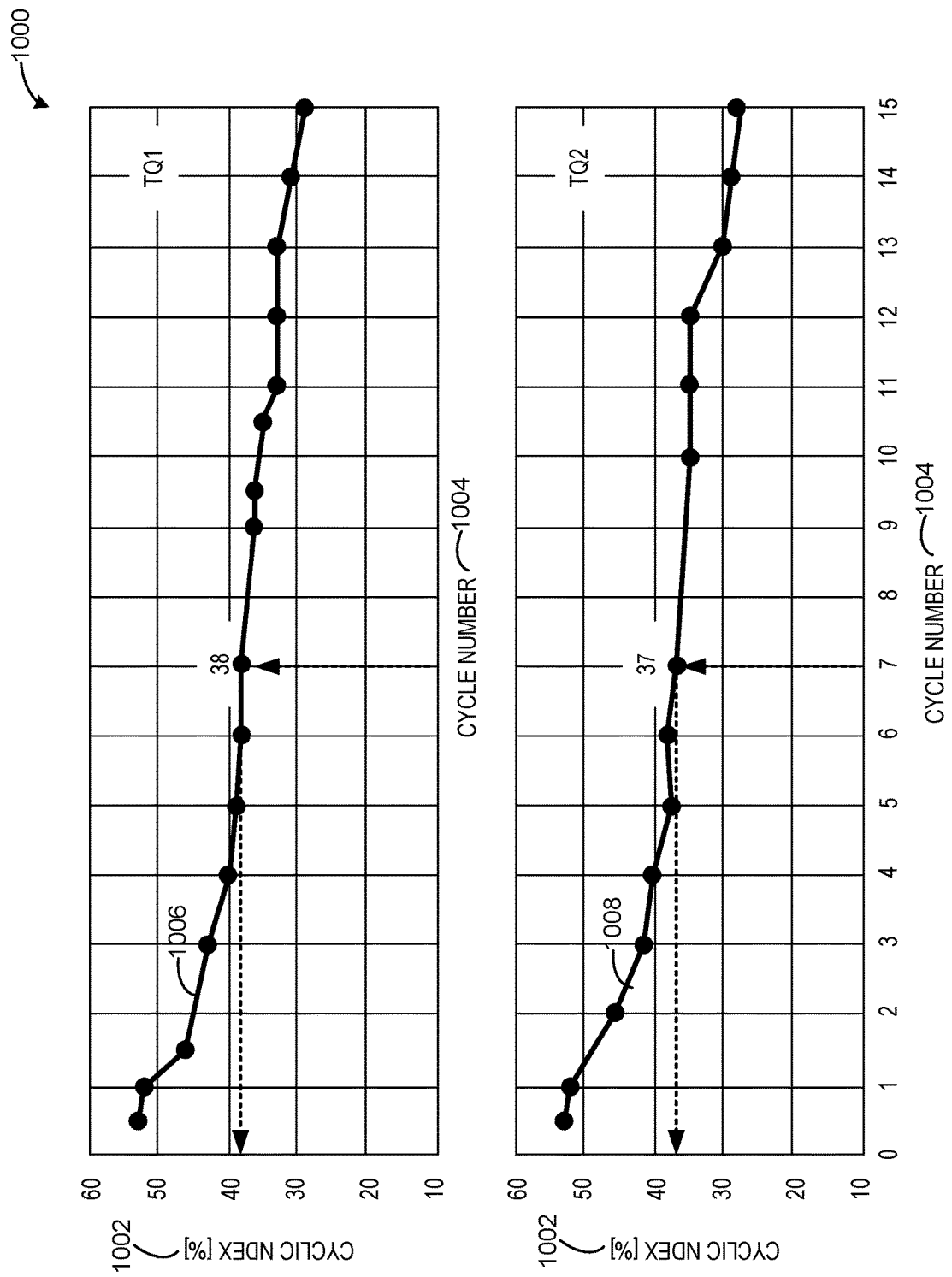
FIG. 10 illustrates an example graphical representation of engine torque (TQ) cyclic indices.

FIG. 10 illustrates an example graphical representation 1000 of cyclic indices of engine torques (TQ1 and TQ2). For example, the cyclic index 1002 corresponds to a given cycle number 1004 for engine torque readings 1006, 1008 (e.g., TQ1 and TQ2). As described in connection with FIG. 4, the drive system analyzer circuitry 204 performs cycle counting based on torque data, where the cycle counting excludes Ground-Air-Ground (GAG) cycles that have the highest torque cycles experience during each flight. For example, the rain flow cycle counting (RFCC)-based data shown in connection with FIG. 9 yield the TQ1 cyclic indices and the TQ2 cyclic indices (CI), which are further used by the drive system analyzer circuitry 204 to identify the DSUSI.

Figure 11:
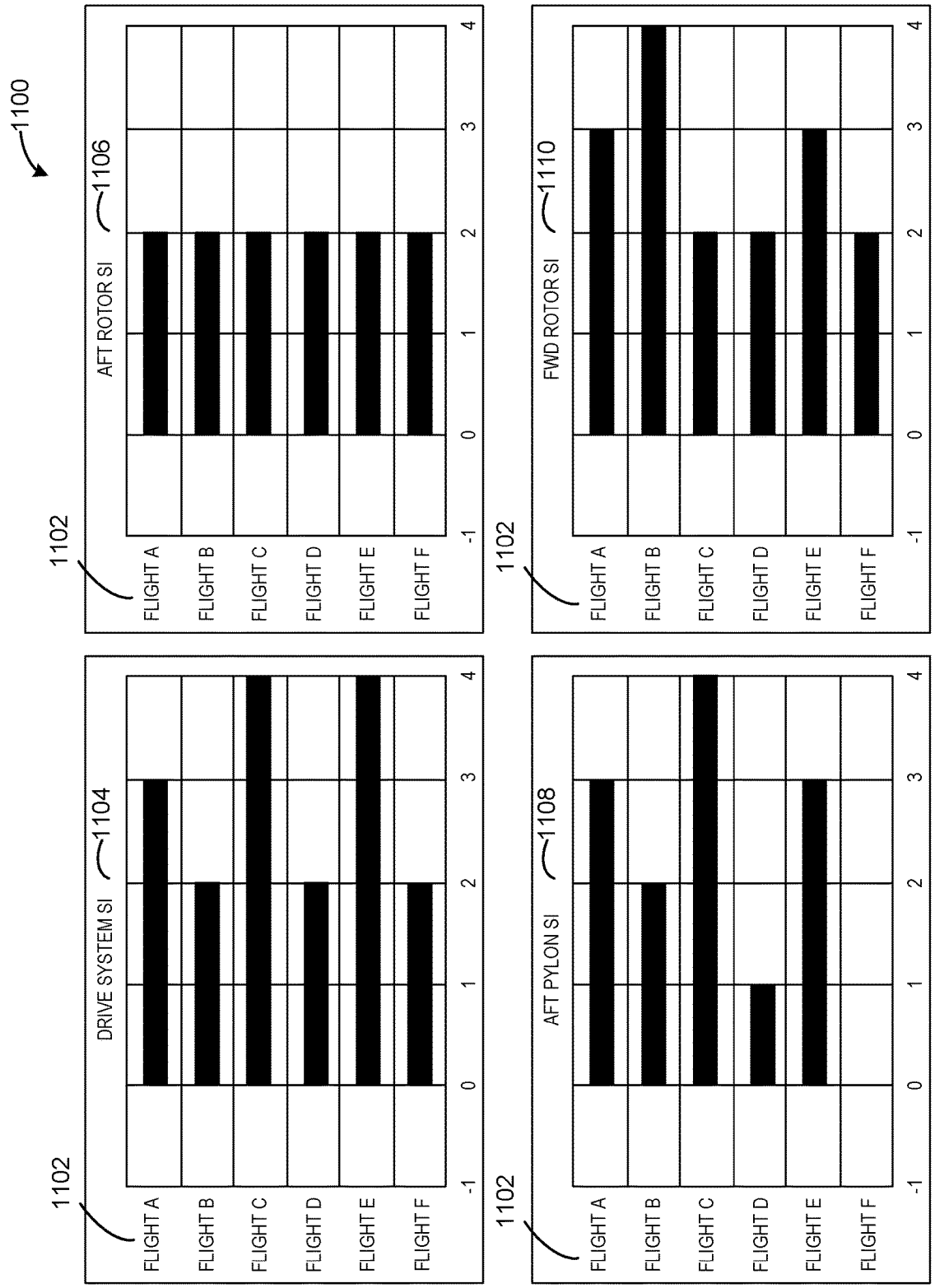
FIG. 11 illustrates example usage severity drive indices generated for a drive system, an aft rotor, an aft pylon structure, and a forward rotor.

FIG. 11 illustrates example usage severity indices 1100 generated for a drive system, an aft rotor, an aft pylon, and a forward rotor. In the example of FIG. 11, the drive system analyzer circuitry 204 determines the drive system usage severity index 1104, the rotor system analyzer circuitry 206 determines the rotor system usage severity index for the aft rotor 1106 and the forward rotor 1110, and the pylon analyzer circuitry 208 determines the aft pylon usage severity index 1108. The severity index identifier circuitry 210 determines the severity indices for all flights 1102 (e.g., flights A-F) evaluated using the drive system analyzer circuitry 204, the rotor system analyzer circuitry 206, and/or the pylon analyzer circuitry 208. The output generator circuitry 212 outputs the graphical representation of the usage severity indices 1100 to allow for visual evaluation of the flight severities. While known approaches include the use of costly and dedicated flight test programs with an instrumented aircraft to assess the general usage of the aircraft fleet, the generation of usage severity indices disclosed herein can be easily implemented into existing post-flight data processing routines (e.g., Structural Usage Monitoring System (SUMS)).

Figure 12:
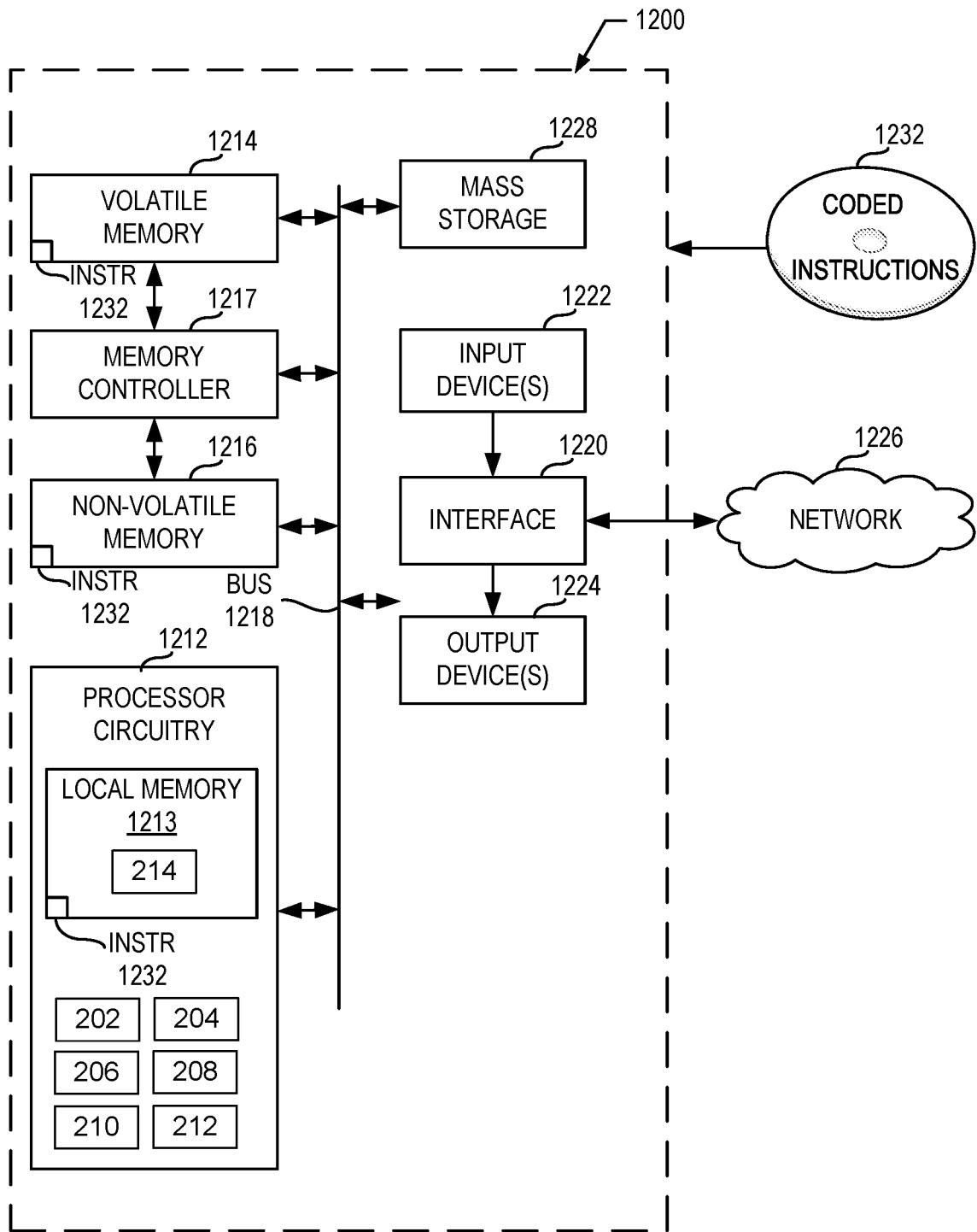
FIG. 12 is a block diagram of an example processing platform structured to execute the instructions of FIGS. 3, 4, 5, and/or 6 to implement the example severity index generator circuitry of FIG. 1 to generate severity indices in accordance with teachings disclosed herein.

FIG. 12 is a block diagram of an example processing platform 1200 structured to execute and/or instantiate the machine readable instructions and/or operations of FIG. 3 to implement the example usage severity index generator circuitry 150 of FIG. 1. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the includes data receiver circuitry 202, drive system analyzer circuitry 204, rotor system analyzer circuitry 206, pylon analyzer circuitry 208, severity index identifier circuitry 210, and output generator circuitry 212. The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIGS. 3, 4, 5 and/or 6, may be stored in the mass storage device 1228, in the volatile memory 1214, in the non-volatile memory 1216, and/or on a removable non-transitory computer readable storage medium such as a CD or DVD.

Figure 13:
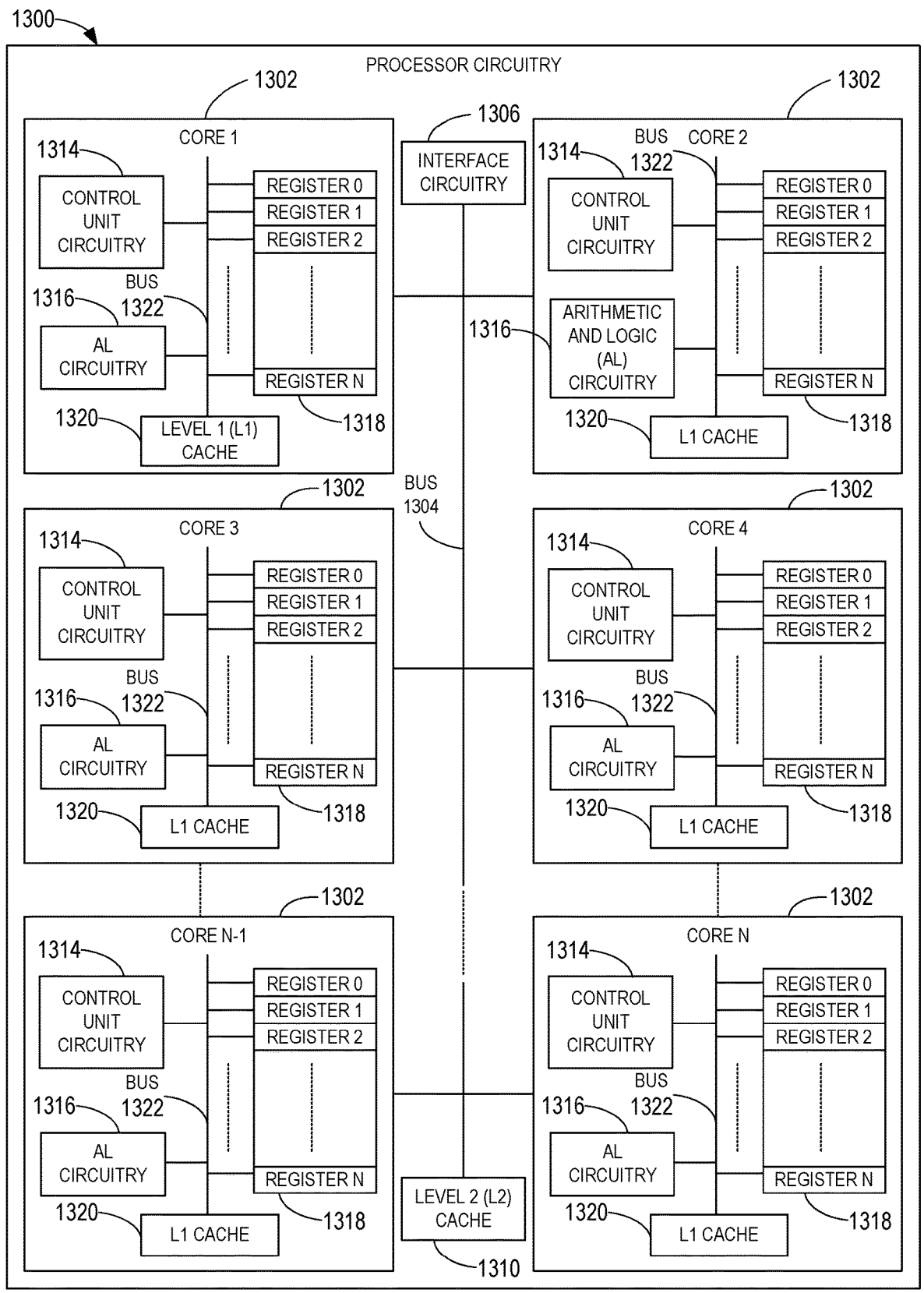
FIG. 13 is a block diagram of an example implementation of the processor circuitry of FIG. 12.

FIG. 13 is a block diagram 1300 of an example implementation of the processor circuitry 1212 of FIG. 12. In this example, the processor circuitry 1212 of FIG. 12 is implemented by a microprocessor 1300. For example, the microprocessor 1300 may be a general purpose microprocessor (e.g., general purpose microprocessor circuitry). The microprocessor 1300 executes some or all of the machine readable instructions of the flowchart of FIGS. 3, 4, 5 and/or 6 to effectively instantiate the circuitry of FIG. 2 as logic circuits to perform the operations corresponding to those machine readable instructions. In some such examples, the circuitry of FIG. 2 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 3, 4, 5 and/or 6.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer-based operations. In other examples, the AL circuitry 1316 also performs floating point operations. In yet other examples, the AL circuitry 1316 may include first AL circuitry that performs integer-based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may be implemented by at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
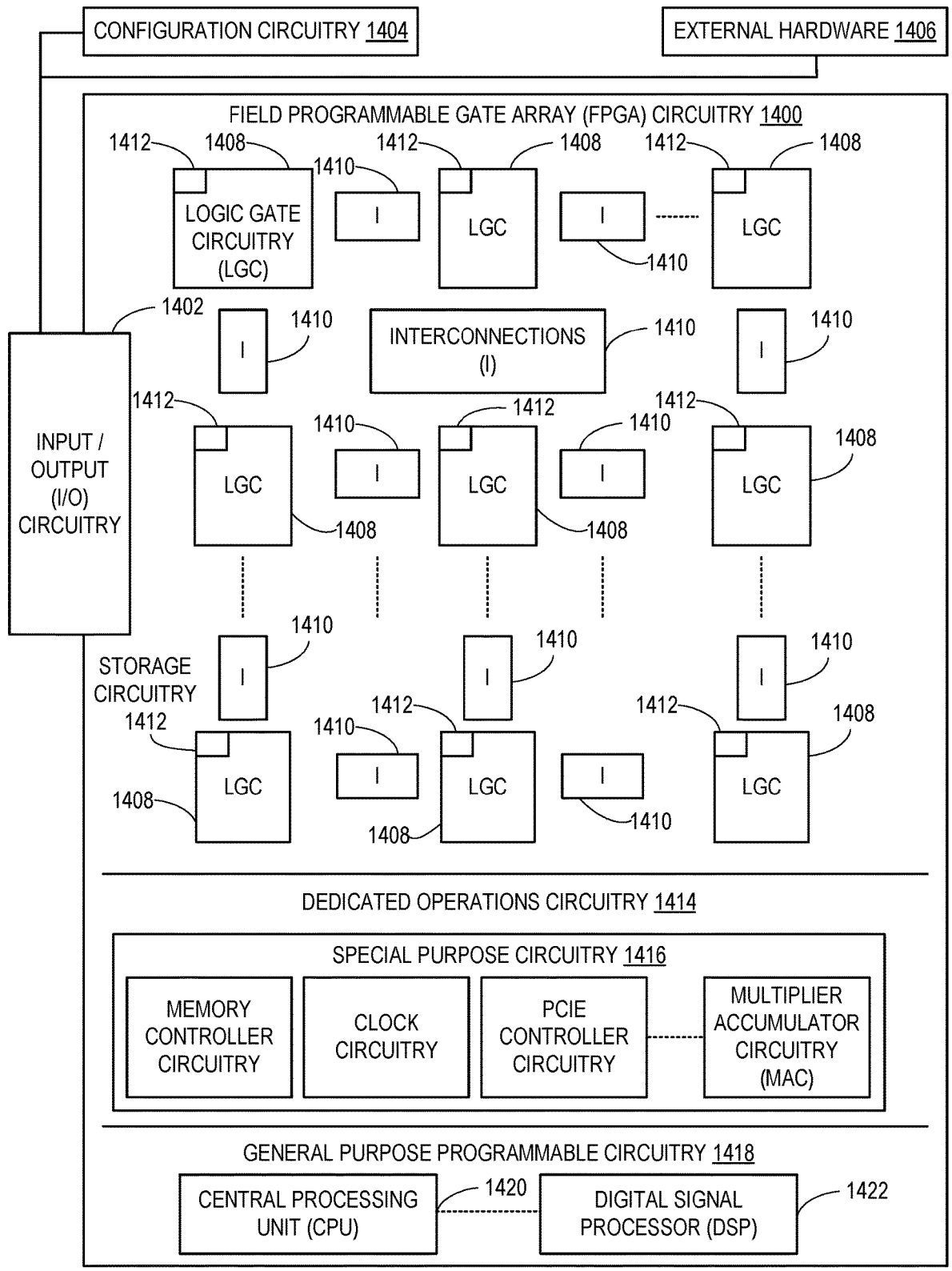
FIG. 14 is a block diagram of another example implementation of the processor circuitry of FIG. 12.

FIG. 14 is a block diagram 1400 of another example implementation of the processor circuitry of FIG. 12. In this example, the processor circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 3, 4, 5 and/or 6 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 3, 4, 5 and/or 6. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 3, 4, 5, and/or 6. As such, the FPGA circuitry 1400 may be structured to effectively instantiate some or all of the machine readable instructions of the flowcharts of FIGS. 3, 4, 5, and/or 6 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 3, 4, 5, and/or 6 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may be implemented by external hardware circuitry. For example, the external hardware 1406 may be implemented by the microprocessor 1400 of FIG. 14. The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations that may correspond to at least some of the machine readable instructions of FIGS. 3, 4, 5, and/or 6 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an onboard CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowchart of FIGS. 3, 4, 5 and/or 6 may be executed by one or more of the cores 1302 of FIG. 13, a second portion of the machine readable instructions represented by the flowcharts of FIGS. 3, 4, 5 and/or 6 may be executed by the FPGA circuitry 1400 of FIG. 14, and/or a third portion of the machine readable instructions represented by the flowcharts of FIGS. 3, 4, 5 and/or 6 may be executed by an ASIC. It should be understood that some or all of the circuitry of FIG. 12 may, thus, be instantiated at the same or different times. Some or all of the circuitry may be instantiated, for example, in one or more threads executing concurrently and/or in series. Moreover, in some examples, some or all of the circuitry of FIG. 12 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12 which may be in one or more packages. For example, the XPU may include a CPU in one package, a DSP in another package, a GPU in yet another package, and an FPGA in still yet another package.

Figure 15:
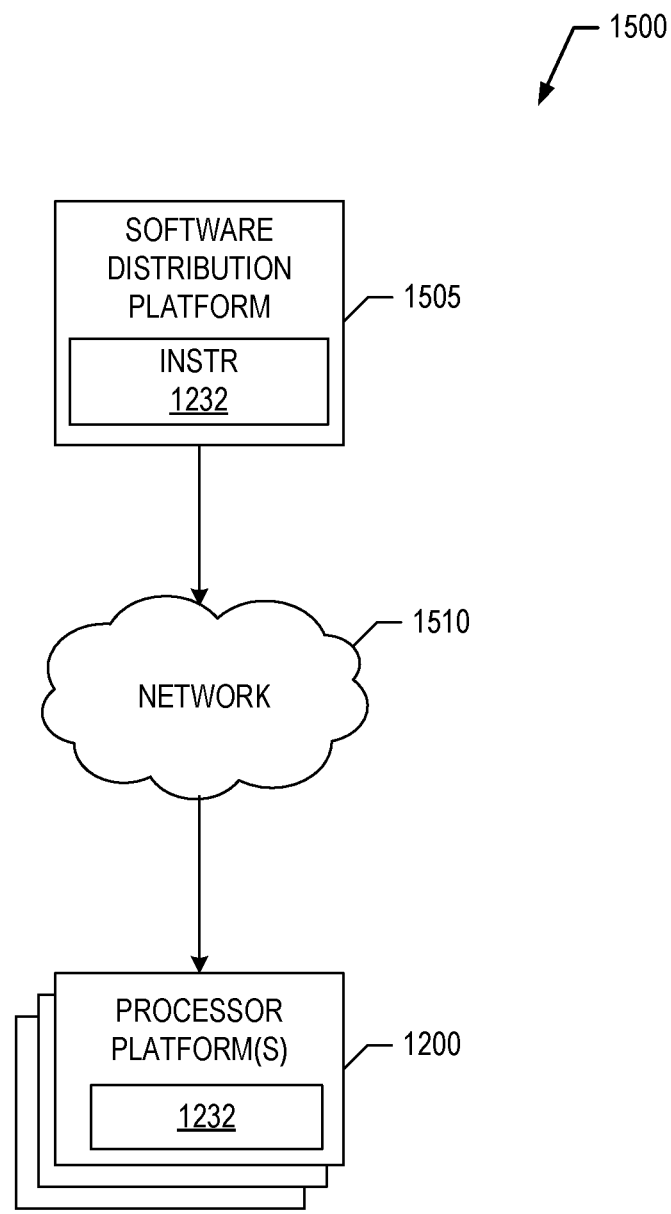
FIG. 15 is a block diagram of an example software distribution platform (e.g., one or more servers) to distribute software (e.g., software corresponding to the example machine readable instructions of FIGS. 3, 4, 5 and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1212 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1212 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1212 of FIG. 12, which may correspond to the example machine readable instructions 300, 320, 330, 340 of FIGS. 3, 4, 5 and/or 6, as described above. The one or more servers of the example software distribution platform 1505 are in communication with a network 1510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1212 from the software distribution platform 1505. For example, the software, which may correspond to the example machine readable instructions 300, 320, 330, 340 of FIGS. 3, 4, 5 and/or 6 may be downloaded to the example processor platform 1200 which is to execute the machine readable instructions 1232 to implement the usage severity index generator circuitry 150. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

Example methods and apparatus for generating usage severity indices are disclosed herein. Further examples and combinations thereof include the following:

Example 1 includes an apparatus, comprising interface circuitry, machine readable instructions, and programmable circuitry to at least one of instantiate or execute the machine readable instructions to determine a first usage severity index for a drive system of an aircraft based on engine torque data, determine a second usage severity index for a rotor system of the aircraft based on cruise guide indicator data, determine a third usage severity index for a pylon structure of the aircraft based on flight regime data, and generate a flight-based usage severity index for the aircraft using the first usage severity index, the second usage severity index, and the third usage severity index.

Example 2 includes the apparatus of example 1, wherein the programmable circuitry is to generate the flight-based usage severity index using at least one of a drive system usage severity criteria, a rotor system usage severity criteria, or a pylon usage severity criteria.

Example 3 includes the apparatus of example 1, wherein the engine torque data includes first torque data for a first engine and second torque data for a second engine.

Example 4 includes the apparatus of example 1, wherein the programmable circuitry is to determine the first usage severity index using rain flow cycle counting to identify torque cyclic indices.

Example 5 includes the apparatus of example 1, wherein the programmable circuitry is to determine the second usage severity index using a time-in-band assessment of cruise guide indicator data.

Example 6 includes the apparatus of example 1, wherein the flight regime data includes climbing, descending, bank turning, acceleration, or deceleration.

Example 7 includes the apparatus of example 1, wherein the programmable circuitry is to determine the second usage severity index or the third usage severity index using an actual usage spectrum (AUS) damage rate and a design usage spectrum (DUS) damage rate.

Example 8 includes the apparatus of example 1, wherein the programmable circuitry is to identify a flight type and a flight duration, the flight type including a ground run flight or an airborne flight.

Example 9 includes the apparatus of example 1, wherein the programmable circuitry is to retrieve at least one of the engine torque data, the cruise guide indicator data, or the flight regime data from a digital source collector.

Example 10 includes a method, comprising determining a first usage severity index for a drive system of an aircraft based on engine torque data, determining a second usage severity index for forward and aft rotor systems of the aircraft based on cruise guide indicator data, determining a third usage severity index for a pylon of the aircraft based on flight regime data, and generating a flight-based usage severity index for the aircraft using the first usage severity index, the second usage severity index, and the third usage severity index.

Example 11 includes the method of example 10, further including generating the flight-based usage severity index using at least one of a drive system usage severity criteria, a rotor system usage severity criteria, or a pylon structural usage severity criteria.

Example 12 includes the method of example 10, further including determining the first usage severity index using rain flow cycle counting to identify a torque cyclic index.

Example 13 includes the method of example 10, further including determining the second usage severity index using a time-in-band assessment of cruise guide indicator data.

Example 14 includes the method of example 10, further including determining the second usage severity index or the third usage severity index using an actual usage spectrum (AUS) damage rate and a design usage spectrum (DUS) damage rate.

Example 15 includes a non-transitory machine readable storage medium comprising instructions to cause programmable circuitry to at least determine a first usage severity index for a drive system of an aircraft based on engine torque data, determine a second usage severity index for a rotor system of the aircraft based on cruise guide indicator data, determine a third usage severity index for a pylon structure of the aircraft based on flight regime data, and generate a flight-based usage severity index for the aircraft using the first usage severity index, the second usage severity index, and the third usage severity index.

Example 16 includes the machine readable storage medium as defined in example 15, wherein the instructions, when executed, cause the programmable circuitry to generate the flight-based usage severity index using at least one of a drive system usage severity criteria, a rotor system usage severity criteria, or a pylon usage severity criteria.

Example 17 includes the machine readable storage medium as defined in example 15, wherein the instructions, when executed, cause the programmable circuitry to determine the first usage severity index using rain flow cycle counting to identify a torque cyclic index.

Example 18 includes the machine readable storage medium as defined in example 15, wherein the instructions, when executed, cause the programmable circuitry to determine the second usage severity index using a time-in-band assessment of cruise guide indicator data.

Example 19 includes the machine readable storage medium as defined in example 15, wherein the instructions, when executed, cause the programmable circuitry to determine the second usage severity index or the third usage severity index using an actual usage spectrum (AUS) damage rate and a design usage spectrum (DUS) damage rate.

Example 20 includes the machine readable storage medium as defined in example 15, wherein the instructions, when executed, cause the programmable circuitry to retrieve at least one of the engine torque data, the cruise guide indicator data, or the flight regime data from a flight data recorder.

From the foregoing, it will be appreciated that example methods and apparatus have been disclosed that permit the generation of usage severity indices that can be used to quantify, rank, and trend the usage severity of an individual flight, aircraft, and/or an entire fleet. In examples disclosed herein, usage severity indices are assigned for flight critical, fatigue life-limited dynamic components (e.g., drive system and rotor system) and/or airframe (aft pylon) structures based on actual usage data from recorded state parameters (e.g., from a helicopter's FDR). In examples disclosed herein, continuous usage severity monitoring can be performed reducing costs associated with traditional operating flight test programs that require deploying fully instrumental aircraft to measure loads and/or monitor the usage of an individual aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
   interface circuitry;
   machine readable instructions; and
   programmable circuitry to at least one of instantiate or execute the machine readable instructions to:
      determine a first usage severity index for a drive system of an aircraft based on a highest cyclic index associated with engine torque data of a first engine and a second engine, the highest cyclic index excluding a ground-air-ground cycle;
      determine a second usage severity index for a rotor system of the aircraft based on cruise guide indicator data;
      determine a third usage severity index for a pylon structure of the aircraft based on flight regime data;
      generate a flight-based usage severity index for the aircraft using the first usage severity index, the second usage severity index, and the third usage severity index; and
      adjust usage of the aircraft based on the flight-based usage severity index, the flight-based usage severity index to validate a retirement life of one or more aircraft components.

2. The apparatus of claim 1, wherein the programmable circuitry is to generate the flight-based usage severity index using at least one of a drive system usage severity criteria, a rotor system usage severity criteria, or a pylon usage severity criteria.

3. The apparatus of claim 1, wherein the engine torque data includes first torque data for the first engine and second torque data for the second engine.

4. The apparatus of claim 1, wherein the programmable circuitry is to determine the first usage severity index using rain flow cycle counting to identify torque cyclic indices.

5. The apparatus of claim 1, wherein the programmable circuitry is to determine the second usage severity index using a time-in-band assessment of cruise guide indicator data.

6. The apparatus of claim 1, wherein the flight regime data includes climbing, descending, bank turning, acceleration, or deceleration.

7. The apparatus of claim 1, wherein the programmable circuitry is to determine the second usage severity index or the third usage severity index using an actual usage spectrum (AUS) damage rate and a design usage spectrum (DUS) damage rate.

8. The apparatus of claim 1, wherein the programmable circuitry is to identify a flight type and a flight duration, the flight type including a ground run flight or an airborne flight.

9. The apparatus of claim 1, wherein the programmable circuitry is to retrieve at least one of the engine torque data, the cruise guide indicator data, or the flight regime data from a digital source collector.

10. The apparatus of claim 1, wherein the highest cyclic index corresponds to a sixth highest cyclic index per hour between engine torque data of the first engine and the second engine.

11. A method, comprising:
- determining a first usage severity index for a drive system of an aircraft based on a highest cyclic index associated with engine torque data of a first engine and a second engine, the highest cyclic index excluding a ground-air-ground cycle;
- determining a second usage severity index for forward and aft rotor systems of the aircraft based on cruise guide indicator data;
- determining a third usage severity index for a pylon of the aircraft based on flight regime data;
- generating a flight-based usage severity index for the aircraft using the first usage severity index, the second usage severity index, and the third usage severity index; and
- adjusting usage of the aircraft based on the flight-based usage severity index, the flight-based usage severity index to validate a retirement life of one or more aircraft components.

12. The method of claim 11, further including generating the flight-based usage severity index using at least one of a drive system usage severity criteria, a rotor system usage severity criteria, or a pylon structural usage severity criteria.

13. The method of claim 11, further including determining the first usage severity index using rain flow cycle counting to identify a torque cyclic index.

14. The method of claim 11, further including determining the second usage severity index using a time-in-band assessment of cruise guide indicator data.

15. The method of claim 11, further including determining the second usage severity index or the third usage severity index using an actual usage spectrum (AUS) damage rate and a design usage spectrum (DUS) damage rate.

16. A non-transitory machine readable storage medium comprising instructions to cause programmable circuitry to at least:
- determine a first usage severity index for a drive system of an aircraft based on a highest cyclic index associated with engine torque data of a first engine and a second engine, the highest cyclic index excluding a ground-air-ground cycle;
- determine a second usage severity index for a rotor system of the aircraft based on cruise guide indicator data;
- determine a third usage severity index for a pylon structure of the aircraft based on flight regime data;
- generate a flight-based usage severity index for the aircraft using the first usage severity index, the second usage severity index, and the third usage severity index; and
- adjust usage of the aircraft based on the flight-based usage severity index, the flight-based usage severity index to validate a retirement life of one or more aircraft components.

17. The machine readable storage medium as defined in claim 16, wherein the instructions, when executed, cause the programmable circuitry to generate the flight-based usage severity index using at least one of a drive system usage severity criteria, a rotor system usage severity criteria, or a pylon usage severity criteria.

18. The machine readable storage medium as defined in claim 16, wherein the instructions, when executed, cause the programmable circuitry to determine the first usage severity index using rain flow cycle counting to identify a torque cyclic index.

19. The machine readable storage medium as defined in claim 16, wherein the instructions, when executed, cause the programmable circuitry to determine the second usage severity index using a time-in-band assessment of cruise guide indicator data.

20. The machine readable storage medium as defined in claim 16, wherein the instructions, when executed, cause the programmable circuitry to determine the second usage severity index or the third usage severity index using an actual usage spectrum (AUS) damage rate and a design usage spectrum (DUS) damage rate.

* * * * *